United States Patent
Lu et al.

(10) Patent No.: US 10,565,306 B2
(45) Date of Patent: Feb. 18, 2020

(54) SENTINEL GATE FOR MODULATING AUXILIARY INFORMATION IN A LONG SHORT-TERM MEMORY (LSTM) NEURAL NETWORK

(71) Applicant: salesforce.com, inc., San Francisco, CA (US)

(72) Inventors: Jiasen Lu, Atlanta, GA (US); Caiming Xiong, Palo Alto, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/817,165

(22) Filed: Nov. 18, 2017

(65) Prior Publication Data

US 2018/0144248 A1 May 24, 2018

Related U.S. Application Data

(60) Provisional application No. 62/424,353, filed on Nov. 18, 2016.

(51) Int. Cl.
*G06K 9/66* (2006.01)
*G06F 17/27* (2006.01)
(Continued)

(52) U.S. Cl.
CPC .......... *G06F 17/276* (2013.01); *G06F 17/241* (2013.01); *G06F 17/2785* (2013.01);
(Continued)

(58) Field of Classification Search
CPC ......... G10L 15/16; G10L 25/30; G06F 17/27; G06F 17/277; G06K 9/00624;
(Continued)

(56) References Cited

U.S. PATENT DOCUMENTS 9,570,069 B2 * 2/2017 Lehman .................. G10L 15/16
9,620,108 B2 * 4/2017 Sak .......................... G10L 15/02
(Continued)

FOREIGN PATENT DOCUMENTS

WO 2016077797 A1 5/2016

OTHER PUBLICATIONS

Xiong et al., "Dynamic Memory Networks for Visual and Textual Question Answering," Mar. 4, 2016, MetaMind, Palo Alto, CA USA, 10 pages.

(Continued)

*Primary Examiner* — Martin Lerner
(74) *Attorney, Agent, or Firm* — Haynes and Boone, LLP

(57) ABSTRACT

The technology disclosed presents a novel spatial attention model that uses current hidden state information of a decoder long short-term memory (LSTM) to guide attention and to extract spatial image features for use in image captioning. The technology disclosed also presents a novel adaptive attention model for image captioning that mixes visual information from a convolutional neural network (CNN) and linguistic information from an LSTM. At each timestep, the adaptive attention model automatically decides how heavily to rely on the image, as opposed to the linguistic model, to emit the next caption word. The technology disclosed further adds a new auxiliary sentinel gate to an LSTM architecture and produces a sentinel LSTM (Sn-LSTM). The sentinel gate produces a visual sentinel at each timestep, which is an additional representation, derived from the LSTM's memory, of long and short term visual and linguistic information.

28 Claims, 25 Drawing Sheets
(8 of 25 Drawing Sheet(s) Filed in Color)

(51) Int. Cl.
*G06K 9/00* (2006.01)
*G06K 9/62* (2006.01)
*G06K 9/46* (2006.01)
*G06F 17/24* (2006.01)
*G06K 9/48* (2006.01)
*G06N 3/08* (2006.01)

(52) U.S. Cl.
CPC ..... *G06K 9/00684* (2013.01); *G06K 9/00986* (2013.01); *G06K 9/4628* (2013.01); *G06K 9/4671* (2013.01); *G06K 9/481* (2013.01); *G06K 9/6277* (2013.01); *G06K 9/66* (2013.01); *G06N 3/08* (2013.01); *G06N 3/082* (2013.01)

(58) Field of Classification Search
CPC .... G06K 9/00711; G06K 9/66; G06N 3/0454; G06N 3/082
USPC ..................... 704/9, 232; 706/15, 27, 30, 20
See application file for complete search history.

(56) References Cited

U.S. PATENT DOCUMENTS

| | | | |
|---|---|---|---|
| 9,760,806 B1* | 9/2017 | Ning | G06K 9/4628 |
| 9,830,709 B2 | 11/2017 | Li | |
| 9,858,524 B2* | 1/2018 | Bengio | G06F 17/28 |
| 10,013,640 B1* | 7/2018 | Angelova | G06K 9/00624 |
| 10,032,498 B2* | 7/2018 | Neil | G11C 11/54 |
| 10,133,729 B2* | 11/2018 | He | G06F 16/3329 |
| 10,282,663 B2 | 5/2019 | Socher et al. | |
| 10,346,721 B2 | 7/2019 | Albright et al. | |
| 2003/0033347 A1 | 2/2003 | Bolle et al. | |
| 2007/0081588 A1 | 4/2007 | Raveendran et al. | |
| 2013/0273968 A1 | 10/2013 | Rhoads et al. | |
| 2016/0063359 A1 | 3/2016 | Szegedy et al. | |
| 2016/0099010 A1* | 4/2016 | Sainath | G10L 25/30 704/232 |
| 2016/0247064 A1* | 8/2016 | Yoo | G06N 3/063 |
| 2016/0299685 A1* | 10/2016 | Zhai | G06F 17/2765 |
| 2016/0342895 A1* | 11/2016 | Gao | G06F 17/2881 |
| 2016/0350653 A1 | 12/2016 | Socher et al. | |
| 2016/0361041 A1 | 12/2016 | Barsimantov et al. | |
| 2017/0024645 A1 | 1/2017 | Socher et al. | |
| 2017/0032280 A1 | 2/2017 | Socher | |
| 2017/0098153 A1* | 4/2017 | Mao | G06N 3/0445 |
| 2017/0127016 A1* | 5/2017 | Yu | G06K 9/00711 |
| 2017/0140240 A1 | 5/2017 | Socher et al. | |
| 2017/0200065 A1 | 7/2017 | Wang et al. | |
| 2017/0200066 A1 | 7/2017 | Wang et al. | |
| 2017/0293638 A1* | 10/2017 | He | G06F 16/5846 |
| 2017/0357720 A1 | 12/2017 | Torabi et al. | |
| 2017/0364766 A1* | 12/2017 | Das | G06N 20/00 |
| 2018/0063168 A1* | 3/2018 | Sofka | G06N 3/0454 |
| 2018/0082171 A1 | 3/2018 | Merity et al. | |
| 2018/0096219 A1 | 4/2018 | Socher et al. | |
| 2018/0096267 A1 | 4/2018 | Masekara et al. | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0124331 A1 | 5/2018 | Min et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1* | 5/2018 | Lu | G06F 17/241 |
| 2018/0144208 A1* | 5/2018 | Lu | G06F 17/241 |
| 2018/0144248 A1 | 5/2018 | Lu et al. | |
| 2018/0268287 A1 | 9/2018 | Johansen et al. | |
| 2018/0268298 A1 | 9/2018 | Johansen et al. | |
| 2018/0300317 A1 | 10/2018 | Bradbury | |
| 2018/0300400 A1 | 10/2018 | Paulus | |
| 2018/0336198 A1 | 11/2018 | Zhong et al. | |
| 2018/0336453 A1 | 11/2018 | Merity et al. | |
| 2018/0349359 A1 | 12/2018 | McCann et al. | |
| 2018/0373682 A1 | 12/2018 | McCann et al. | |
| 2018/0373987 A1 | 12/2018 | Zhang et al. | |
| 2019/0108432 A1 | 4/2019 | Lu et al. | |
| 2019/0108439 A1 | 4/2019 | Lu et al. | |
| 2019/0130206 A1 | 5/2019 | Trott et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0149834 A1 | 5/2019 | Zhou et al. | |
| 2019/0188568 A1 | 6/2019 | Keskar et al. | |
| 2019/0213482 A1 | 7/2019 | Socher et al. | |
| 2019/0251168 A1 | 8/2019 | McCann et al. | |
| 2019/0251431 A1 | 8/2019 | Keskar et al. | |
| 2019/0258714 A1 | 8/2019 | Zhong | |
| 2019/0258901 A1 | 8/2019 | Albright et al. | |
| 2019/0258939 A1 | 8/2019 | Min et al. | |

OTHER PUBLICATIONS

Stollenga et al., "Deep Networks with Internal Selective Attention through Feedback Connections," Jul. 28, 2014, ICML, 13 pages.
Socher, "Deep NLP Applications and Dynamic Memory Network," Aug. 11, 2015, MetaMind Lecture, 46 pages.
Sutskever et al., "Sequence to Sequence Learning with Neural Networks," Dec. 14, 2014, Google, 9 pages.
Kumar et al., "Ask Me Anything: Dynamic Memory Networks for Natural Language Processing," Jun. 24, 2015, MetaMind, Palo Alto, CA, 10 pages.
Weston et al., "Memory Networks," Nov. 29, 2015, Conference paper at ICLR 2015, 15 pages.
Tai et al., Improved Semantic Representations From Tree-Structured Long Short-Term Memory Networks, May 30, 2015, Computer Science Department, Stanford University, MetaMind Inc., 11 pages.
Cho et al., "Learning Phrase Representations using RNN Encoder-Decoder for Statistical Machine Translation," Sep. 13, 2014, Université de Montréal, Jacobs University, Germany, Université du Maine, France, Université de Montréa;, CIFAR Senior Fellow, 15 pages.
Gers et al., "Learning to Forget: Continual Prediction with LSTM," Jan. 1999, Technical Report IDSIA-01-99, 19 pages.
Kumar et al., "Ask Me Anything: Dynamic Memory Networks for Natural Language Processing," Mar. 5, 2016, MetaMind, Palo Alto, CA, 10 pages.
Socher et al., "Reasoning With Neural Tensor Networks for Knowledge Base Completion", Computer Science Dept., Stanford University, Stanford, CA, USA 2013, 10 pages.
Garcia-Pedraja, et. al., "Cooperative-Coevolution-of-Artificial-Neural-Networks", 2005, 32 pages.
Stanley, et al., "Evolving Neural Networks through Augmenting Topologies", 2002, 30 pages.
Snoek, et al., "Scalable Bayesian Optimization Using Deep Neural Networks", 2015, 13 pages.
PCT/US2016/047104—International Search Report & Written Opinion dated Nov. 30, 2016, 18 pages.
De Brebjsson et al, "Deep Neural Networks for Anatomical Brain Segmentation", 2015 IEEE Conference, Jun. 7, 2015, 9 pages.
Payan, et al., "Predicting Alzheimer's Disease: a Neuroimaging Study With 3D Convolutional Neural Networks", Feb. 10, 2015, 9 pages.
Kamnitsas, et al., "Multi-Scale 3D Convolutional Neural Networks for Lesion Segmentation in Brain MRI", Aug. 10, 2015, 4 pages, [Retrieved on Jan. 13, 2016], Retrieved from the internet <URL:http://www.doc.ic.ac.uk/-bglocker/pdfs/kamnitsas2015isles.pdf>.
Miccai, "BraTS Challenge Manuscripts",Sep. 14, 2014, 42 pages, [Retrieved on Nov. 22, 2016], Retrieved from the Internet: <URL:http://people.csail.mit.edu/menze/papers/proceedings miccai brats> 2014.pdf>.
Szegedy, et al., "Going Deeper with Convolutions", 2015, 9 pages.
Ioffe, et al., "Batch Normalization: Accelerating Deep Network Training by Reducing Internal Covariate Shift", proceedings of the 32nd International Conference on Machine Learning, France, 2015, 9 pages.

(56) References Cited

OTHER PUBLICATIONS

Krizhevsky, et al.,"ImageNet Classification with Deep Convolutional Neural Networks", Advances in Neural Information Processing Systems 25, 2012, 9 pages.
PCT/US2016/047104—Response to International Search Report & Written Opinion dated Nov. 30, 2016 filed Jun. 15, 2017, 20 pages.
PCT/US2016/047104—Written Opinion of the International Preliminary Examining Authority dated Jul. 17, 2017, 7 pages.
Anderson et al., "Spice: Semantic Propositional Image Caption Evaluation," European Conference on Computer Vision. Amsterdam, Netherlands. Oct. 8-16, 2016. pp. 1-17.
Bahdanau et al., "Neural Machine Translation by Jointly Learning to Align and Translate," Published as a Conference Paper at the International Conference on Learning Representation, 2015. pp. 1-15.
Chen et al., "Minds Eye: A Recurrent Visual Representation for Image Caption Generation," Conference on Computer Vision and Pattern Recognition. Boston, Mass. Jun. 7-12, 2015. pp. 1-17.
Chen et al., "SCA-CNN: Spatial and Channel-Wise Attention in Convolutional Networks for Image Captioning," Conference on Computer Vision and Pattern Recognition. Caesars Palace, Las Vegas Valley, NV. Jun. 26-Jul. 1, 2016. pp. 1-9.
Cho et al., "Learning Phrase Representations using RNN Encoder-Decoder for Statistical Machine Translation," Conference on Empirical Methods in Natural Language Processing. Doha, Qatar. Sep. 3, 2014. pp. 1-15.
Denkowski et al., "Meteor Universal: Language Specific Translation Evaluation for any Target," 14th Conference of Ihe European Chapter of the Association for Computational Linguistics. Gothenburg, Sweden, Apr. 26-30, 2014. pp. 1-5.
Devlin et al., "Exploring Nearest Neighbor Approaches for Image Captioning," Computer Vision and Pattern Recognition. Boston, Mass. Jun. 7-12, 2015. pp. 1-6.
Donahue et al., "Long-term Recurrent Convolutional Networks for Visual Recognition and Description." In Computer Vision and Pattern Recognition. Boston, Massachusetts. Jun. 7-12, 2015. pp. 1-10.
Fang et al., "From Captions to Visual Concepts and Back," Computer Vision and Pattern Recognition. Boston, Massachusetts. Jun. 7-12, 2015. pp. 1-10.
Farhadi et al., "Every Picture Tells a Story: Generating Sentences From Images," European Conference on Computer Vision. Crete, Greece. Sep. 5-11, 2010. pp. 1-14.
He et al., "Deep Residual Learning for Image Recognition," IEEE Conference on Computer Vision and Pattern Recognition. Las Vegas Valley, NV. Jun. 26-Jul. 1, 2016. pp. 1-8.
Kiros et al., "Multimodal Neural Language Models," International Conference on Machine Learning, Beijing, China. Jun. 22-24, 2014. pp. 1-14.
Kiros et al., "Unifying Visual-Semantic Embedding with Multimodal Neural Language Models," Twenty-Eighth Conference on Neural Information Processing Systems. Montréal, Canada. Dec. 8-13, 2014. pp. 1-13.
Kulkarni et al., "Babytalk: Understanding and Generating Simple Image Descriptions," IEEE Computer Vision and Pattern Recognition. Colorado Springs, Colorado. Jun. 21-23, 2011. pp. 1-8.
Kuznetsova et aL, "Collective Generation of Natural Image Descriptions," Association for Computational Linguistics. Jeju Island, Korea. Jul. 8-14, 2012. pp. 1-10.
Lin et al., "Rouge: A Package for Automatic Evaluation of Summaries." Proceedings of the Association for Computational Linguistics Workshop (vol. 8). Barcelona, Spain. May 2-7, 2004. pp. 1-8.
Lin et al., "Microsoft Coco: Common Objects in Context," European Conference on Computer Vision. Zurich, Switzerland, Sep. 6-12, 2014. pp. 1-15.
Lu et al., "Hierarchical Question Image Co-Attention for Visual Question Answering," 30th Conference on Neural Information Processing Systems. Barcelona, Spain. Jan. 1, 2016. pp. 1-9.
Lu et al., "Knowing When to Look: Adaptive Attention via a Visual Sentinel for Image Captioning," Conference on Computer Vision and Pattern Recognition. Honolulu, HI. Jul. 21-26, 2017. pp. 1-12.
Mao et al., "Deep Captioning with Multimodal Recurrent Neural Networks," International Conference on Learning Representation, San Diego, CA. May 7-9, 2015. pp. 1-17.
Merity et al., "Pointer Sentinel Mixture Models," Published as a Conference paper at the International Conference on Learning Representations. Sep. 26, 2016. pp. 1-13.
Mitchell et al., "Midge: Generating Image Descriptions from Computer Vision Detections," 13th Conference of the European Chapter of the Association for Computational Linguistics. Avignon, France. Apr. 23-27, 2012. pp. 1-10.
Papineni et al., "BLEU: A Method for Automatic Evaluation of Machine Translation," Proceedings of the 40th Annual Meeting of the Association for Computational Linguistics. Philadelphia, Pennsylvania. Jul. 7-12, 2002. pp. 1-8.
Selvaraju et al., "Grad-CAM: Visual Explanations from Deep Networks via Gradient-based Localization," Computer Vision and Pattern Recognition. Las Vegas Valley, NV. Jun. 26-Jul. 1, 2016. pp. 1-24.
Socher et al., "Grounded Compositional Semantics for Finding and Describing Images with Sentences," Transactions of the Association for Computational Linguistics. Baltimore, Maryland. Jun. 22-27, 2014. pp. 1-12.
Sutskever et al., "Sequence to Sequence Learning with Neural Networks," Advances in Neural Information Processing Systems. Montréal, Canada. Dec. 14, 2014. pp. 1-9.
Szegedy et al., "Rethinking the Inception Architecture for Computer Vision," Computer Vision and Pattern Recognition. Boston, Massachusetts. Jun. 7-12, 2015. pp. 1-10.
Vedantam et al., "CIDEr: Consensus-based Image Description Evaluation." Computer Vision and Pattern Recognition. Boston, Massachusetts. Jun. 7-12, 2015. pp. 1-17.
Vinyals et al., "Show and Tell: A Neural Image-Caption Generator." Computer Vision and Pattern Recognition. Boston, Massachusetts. Jun. 7-12, 2015. pp. 1-9.
Wu et al."What value do explicit high level concepts have in vision to language problems?" IEEE Conf. Computer Vision and Pattern Recognition. Las Vegas Valley, NV. Jun. 26-Jul. 1, 2016. pp. 1-10.
Xiong et al., "Dynamic Coattention Networks for Question Answering," Published as a Conference Paper at the International Conference on Learning Representations. Toulon, France. Apr. 24-26, 2017. pp. 1-14.
Xu et al., "Show, Attend and Tell: Neural Image Caption Generation with Visual Attention." Proceedings of the 32nd International Conference on Machine Learning. Lille, France. Jul. 6-11, 2015. pp. 1-22.
Yang et al., "Stacked Attention Networks for Image Question Answering." IEEE Conference on Computer Vision and Pattern Recognition. Las Vegas Valley, NV. Jun. 26-Jul. 1, 2016. pp. 1-11.
Yang et al., "Encode, Review and Decode: Reviewer Module for Caption Generation." Conference on Neural Information Processing Systems. Dec. 5-10, 2016. pp. 1-9.
Yao et al., "Boosting Image Captioning With Attributes." International Conference on Learning Representations. Toulon, France. Apr. 24-26, 2017. pp. 1-11.
You et al., "Image Captioning with Semantic Attention." Conference on Computer Vision and Pattern Recognition. Vegas Valley, NV. Jun. 26-Jul. 1, 2016. pp. 1-10.
Young et al., "From image descriptions to visual denotations: New similarity metrics for semantic inference over event descriptions." 52nd Annual Meeting of the Association for Computational Linguistics. Baltimore, Maryland. Jun. 22-27, 2014. pp. 1-12.
Zhou et al., "Learning Deep Features for Discriminative Localization" Computer Vision and Pattern Recognition. Boston, Massachusetts. Jun. 7-12, 2015. pp. 1-10.
International Search Report issued by the International Searching Authority dated Feb. 22, 2018 for PCT Application No. PCT/US2017/062433. pp. 1-4.
Written Opinion issued by the International Searching dated Feb. 22, 2018 for PCT Application No. PCT/US2017/062433. pp. 1-9.

(56) References Cited

OTHER PUBLICATIONS

International Search Report issued by the International Searching Authority dated Feb. 26, 2018 for PCT Application No. PCT/US2017/062434. pp. 1-4.

Written Opinion issued by the International Searching Authority dated Feb. 26, 2018 for PCT Application No. PCT/US2017/062434. pp. 1-11.

International Search Report issued by the International Searching Authority dated Feb. 22, 2018 for PCT Application No. PCT/US2017/062435. pp. 1-4.

Written Opinion issued by the International Searching Authority dated Feb. 22, 2018 for PCT Application No. PCT/US2017/062435. pp. 1-7.

Karpathy et al., "Deep Visual-Semantic Alignments for Generating Image Descriptions," Conference on Computer Vision and Pattern Recognition, Boston, Massachusetts, Jun. 7-12, 2015, pp. 1-17.

* cited by examiner

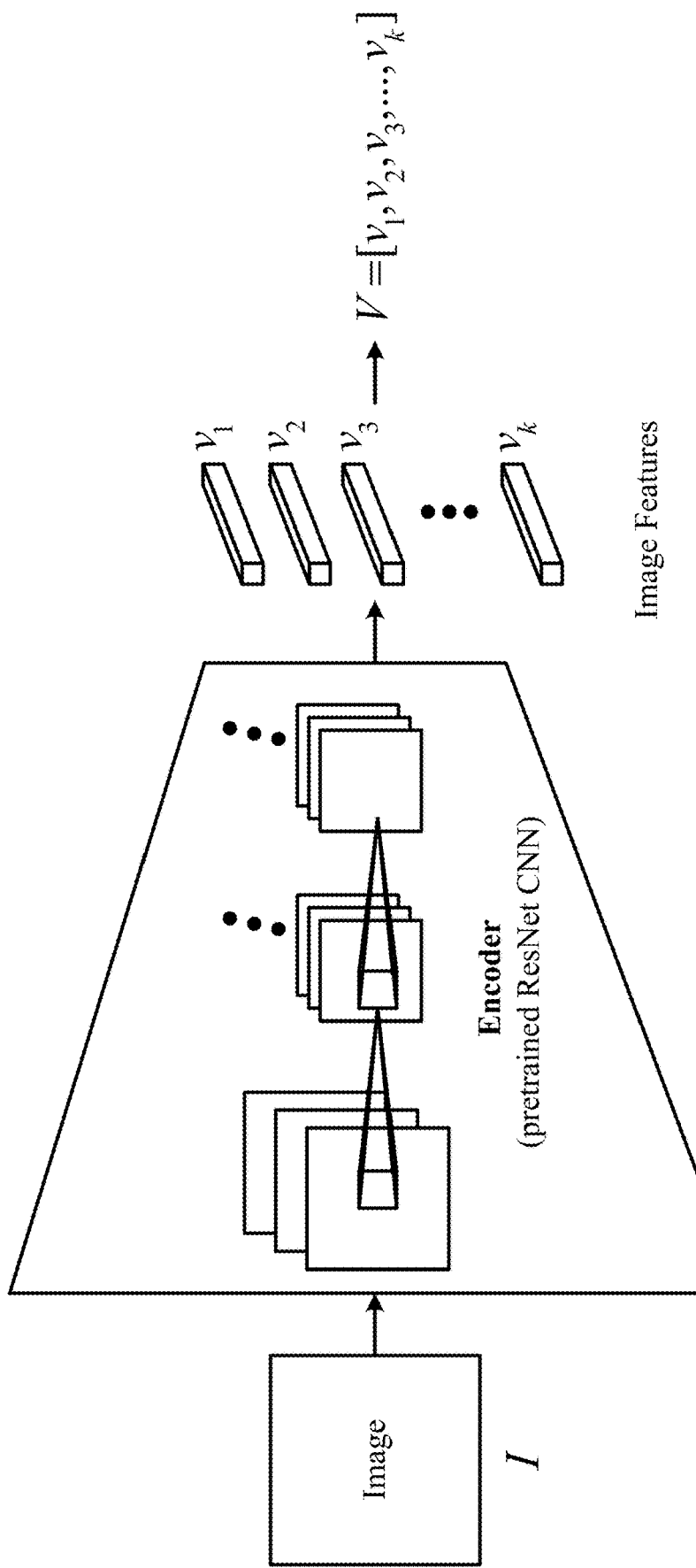
FIG. 1 – Encoder

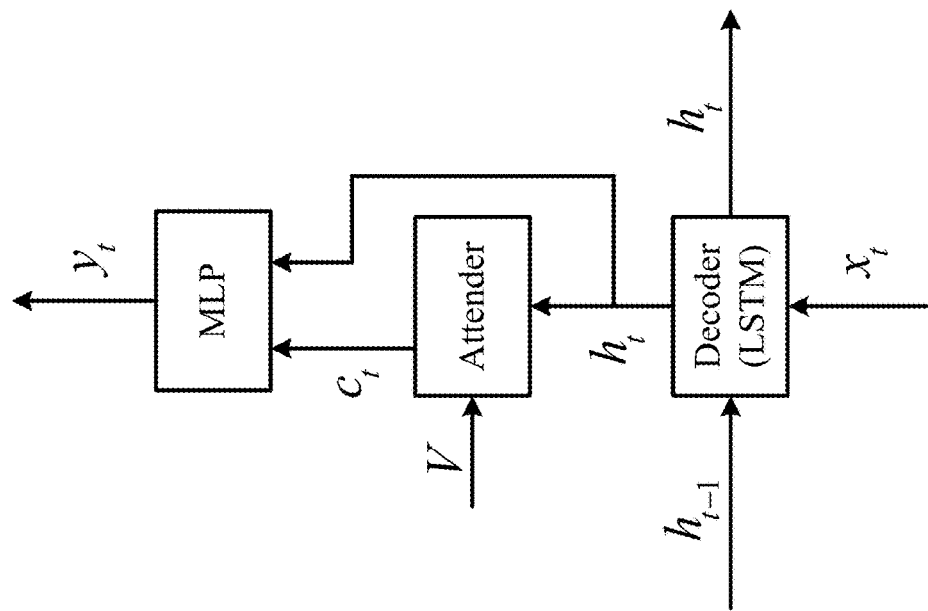
FIG. 2B – Attention Lagging Decoder (technology disclosed)
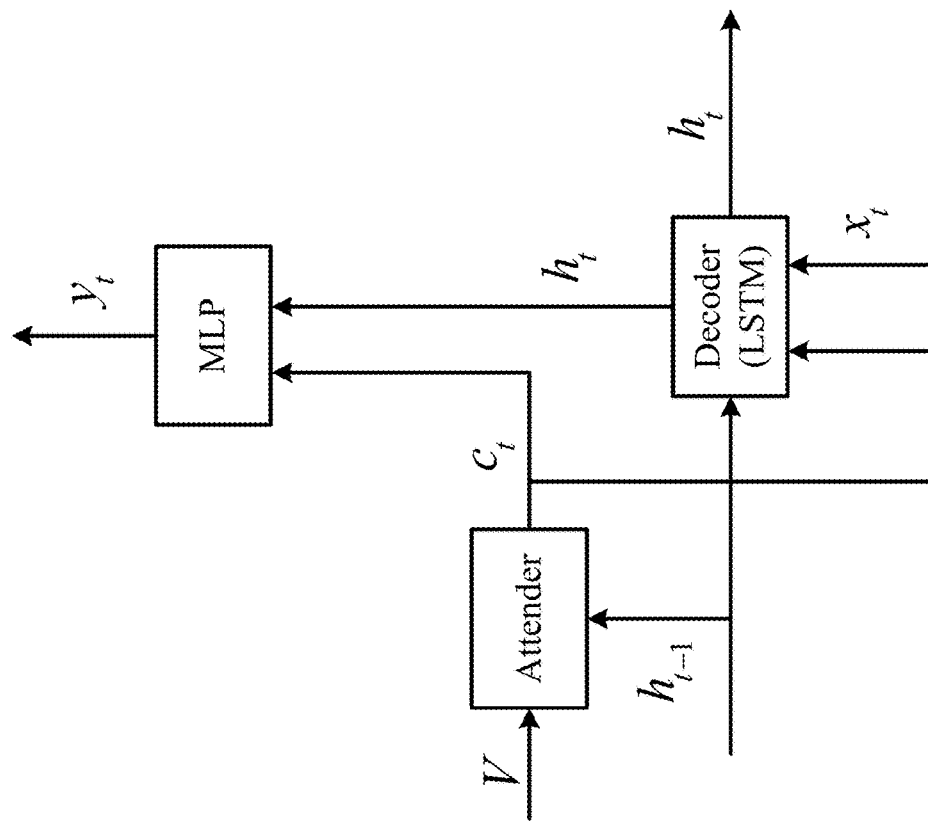
FIG. 2A – Attention Leading Decoder (prior art)

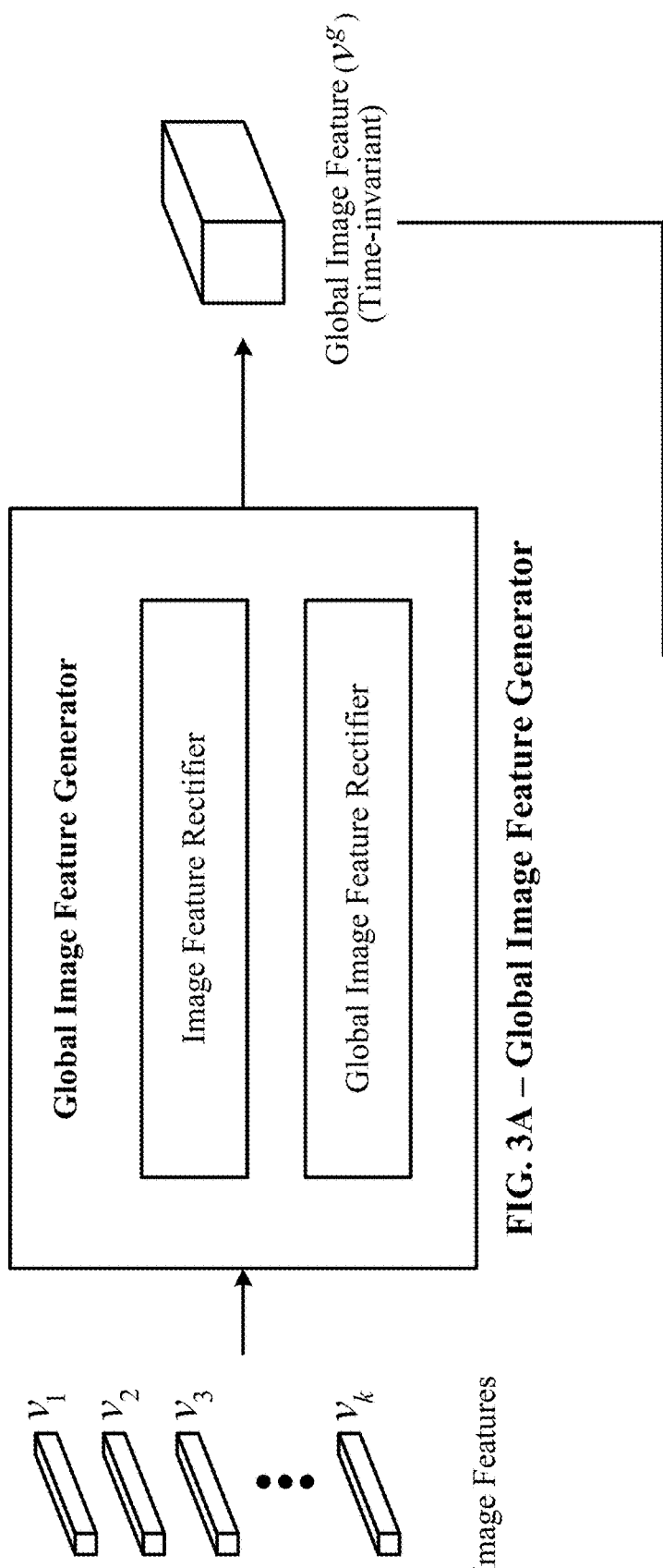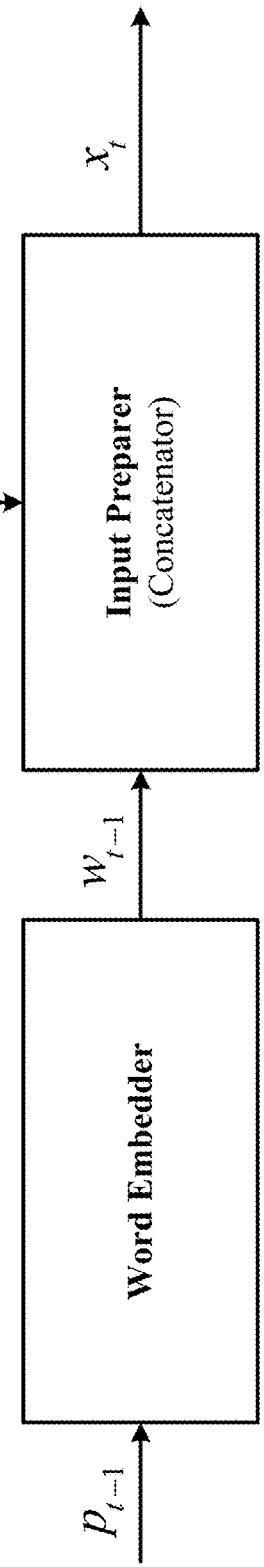
FIG. 3A – Global Image Feature Generator
FIG. 3B – Word Embedder
FIG. 3C – Input Preparer

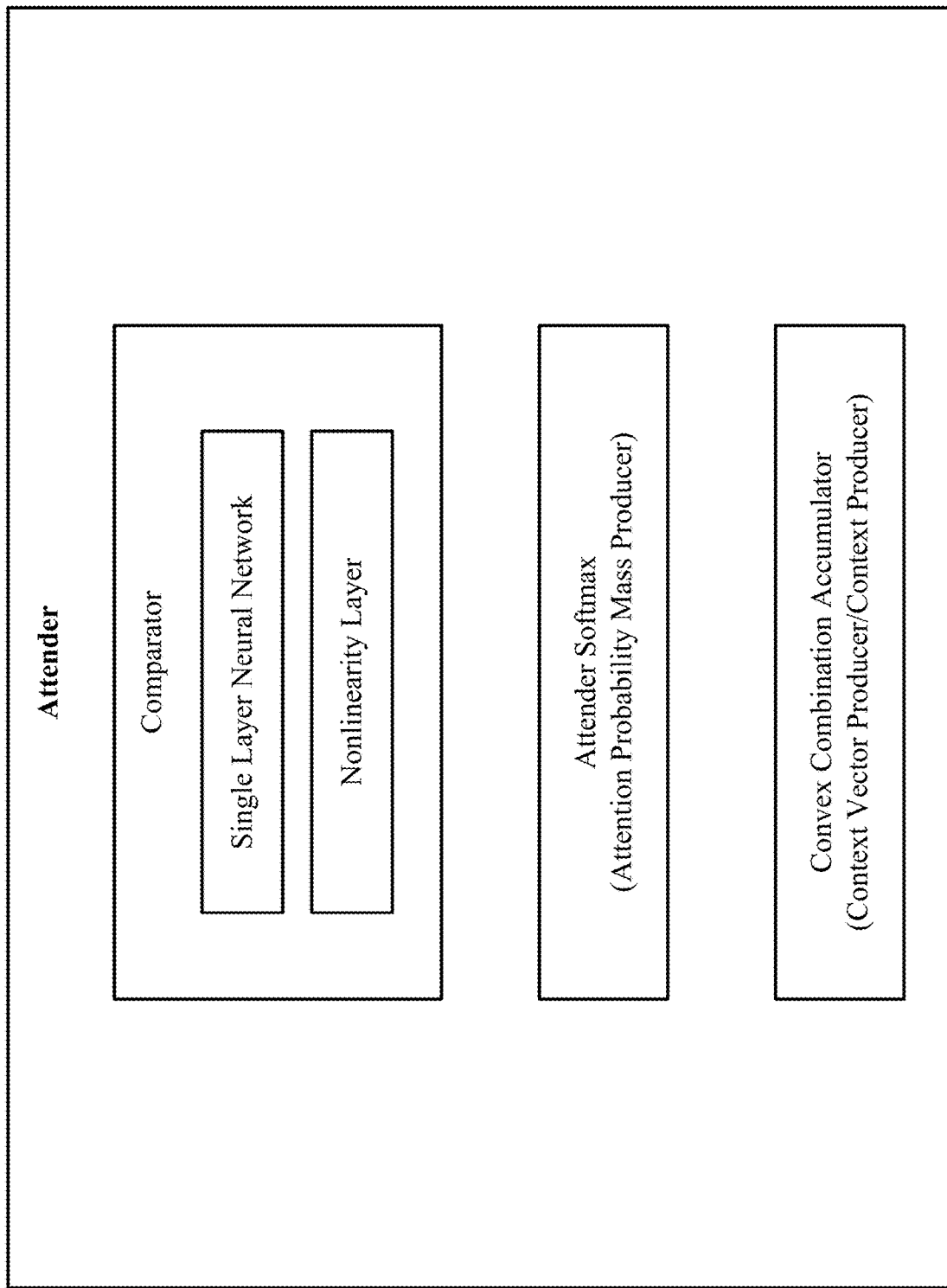
FIG. 4 – Attender

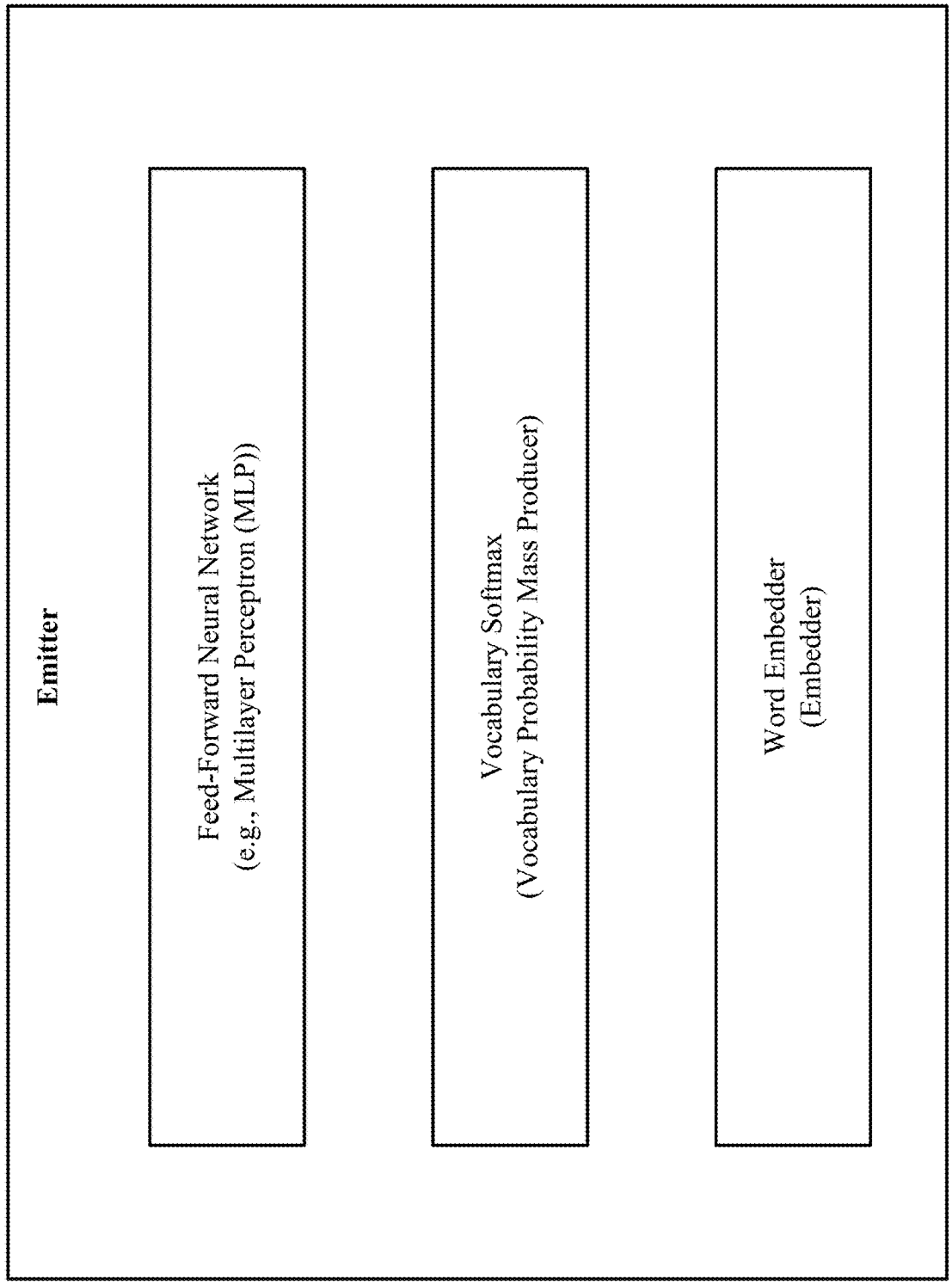
FIG. 5 – Emitter

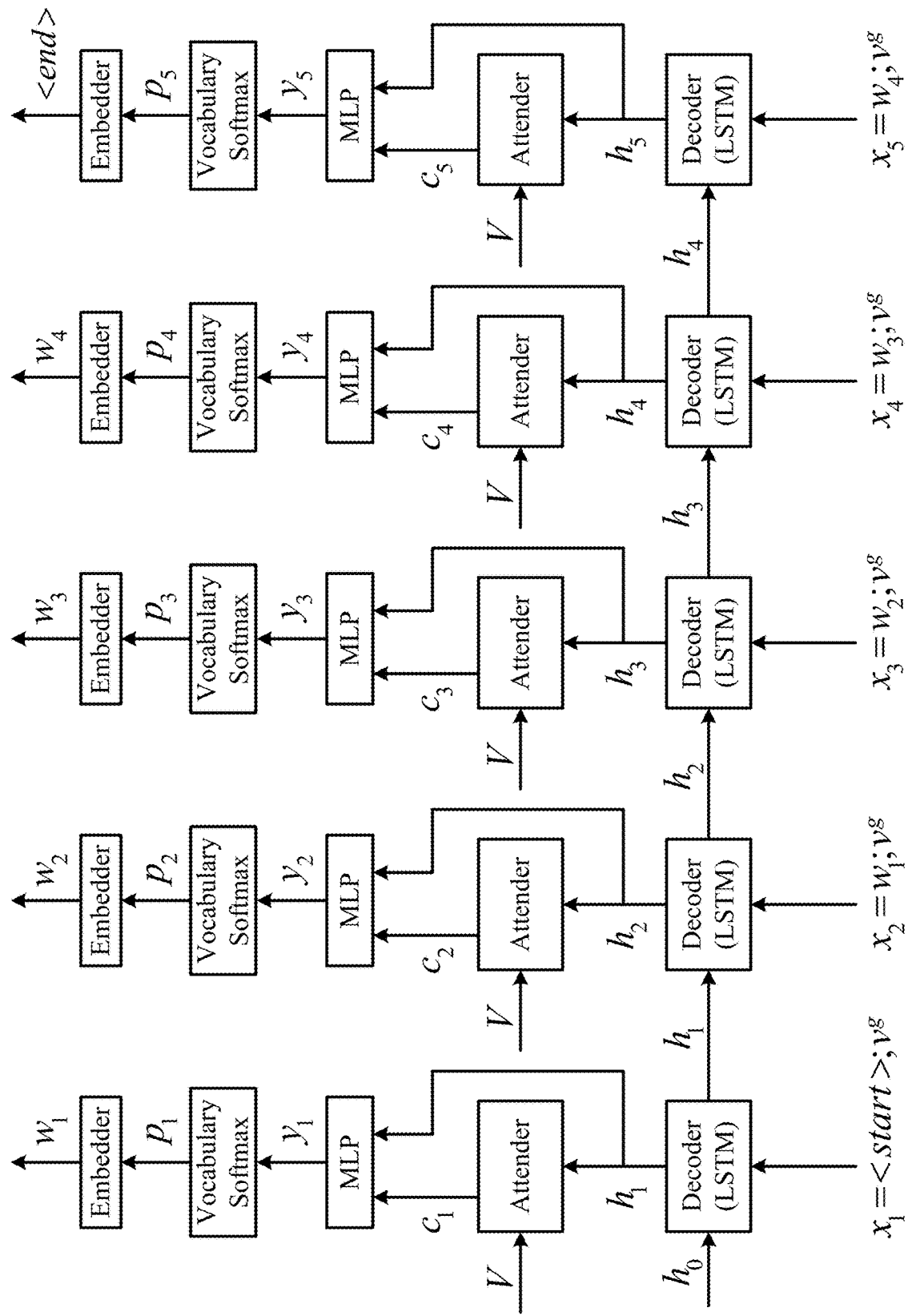
FIG. 6 – Spatial Attention Model (rolled-across-timesteps)

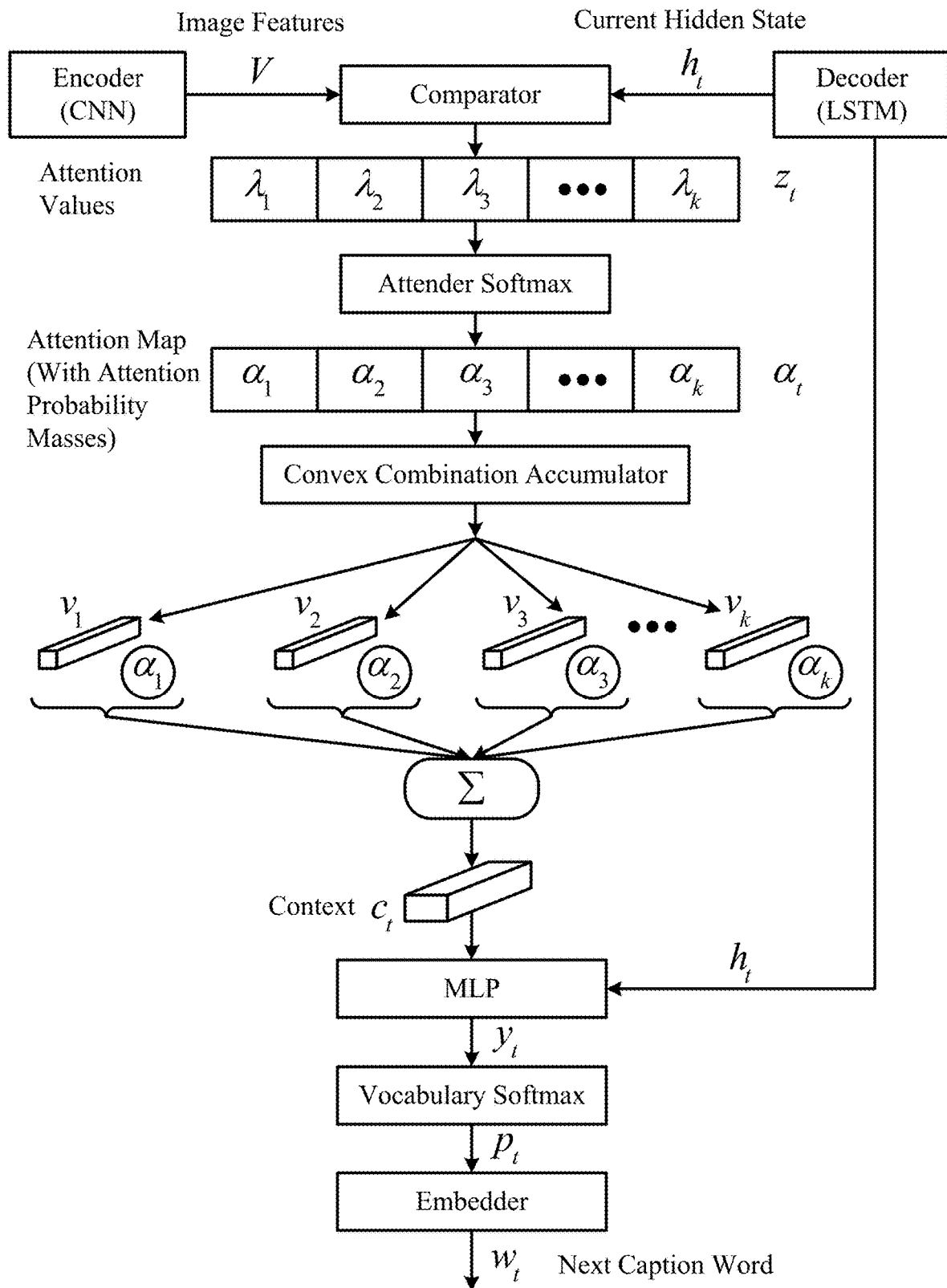
FIG. 7 – Spatial Attention

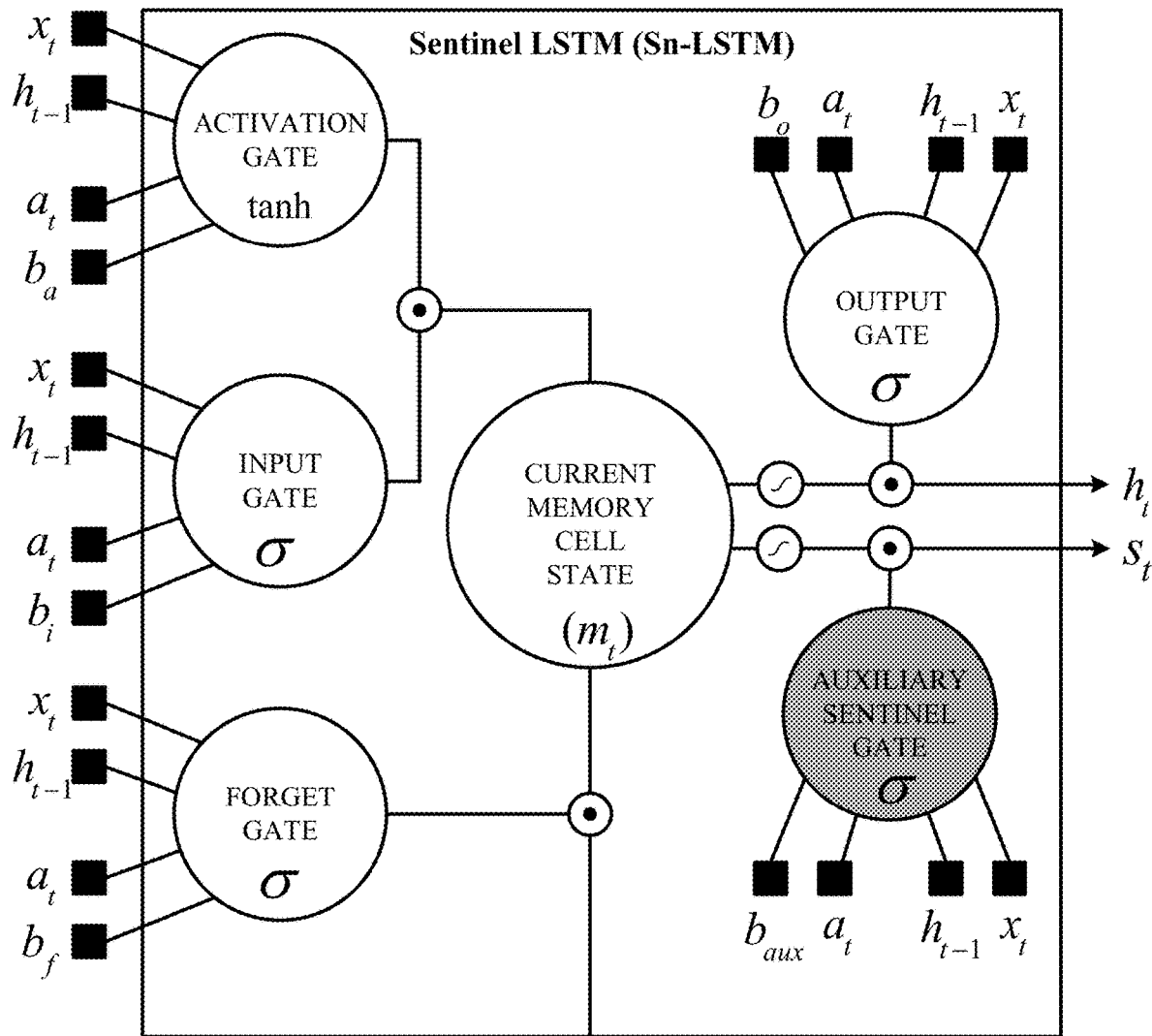
FIG. 8 – Sentinel LSTM (Sn-LSTM)

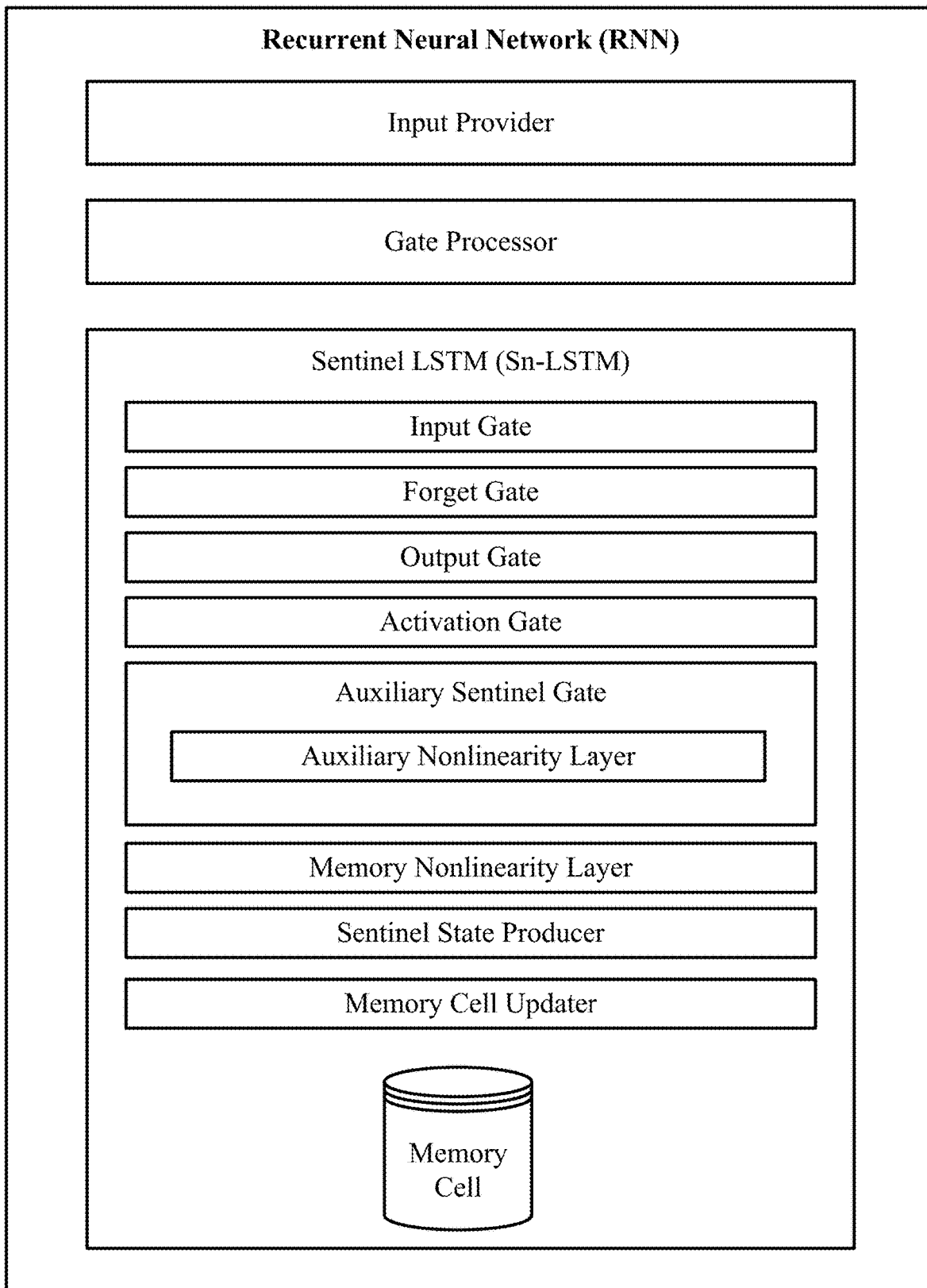
FIG. 9 – Recurrent Neural Network (RNN)

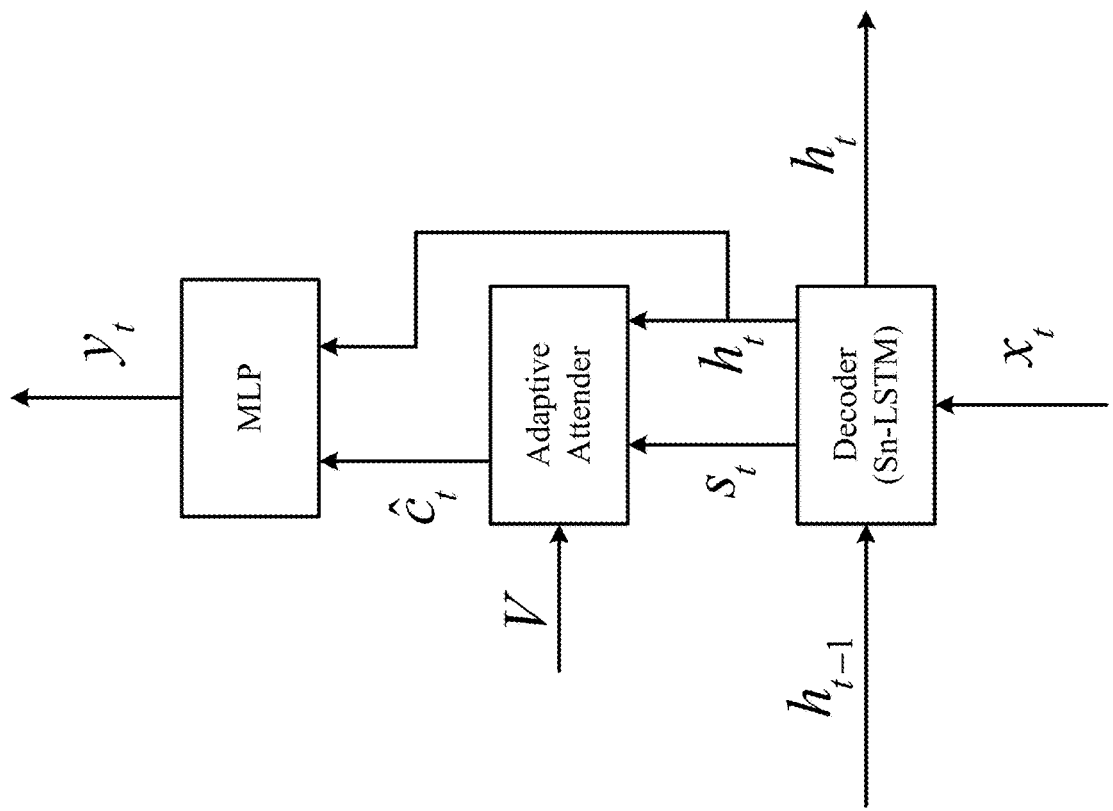
FIG. 10 – Adaptive Attention Model

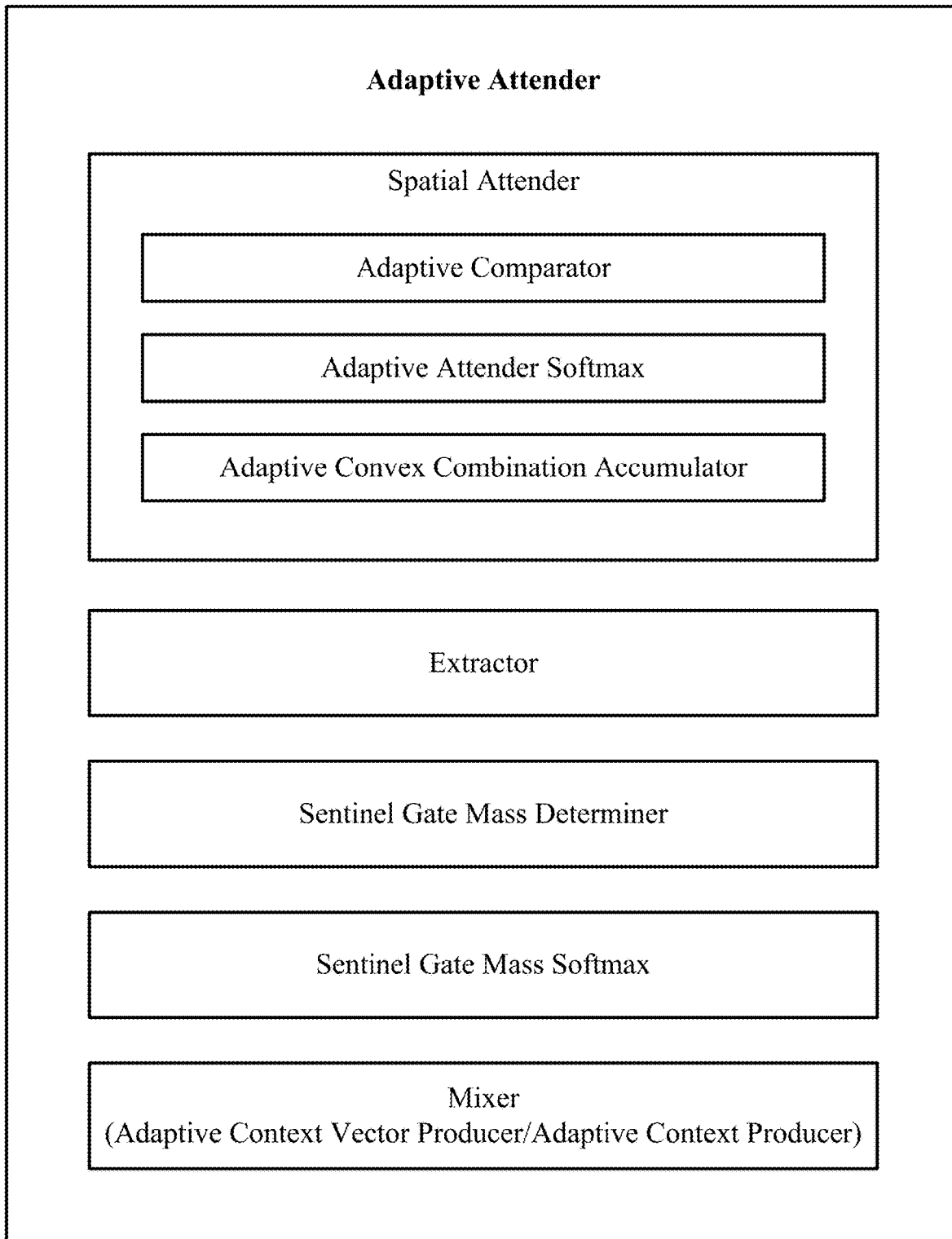
FIG. 11 – Adaptive Attender

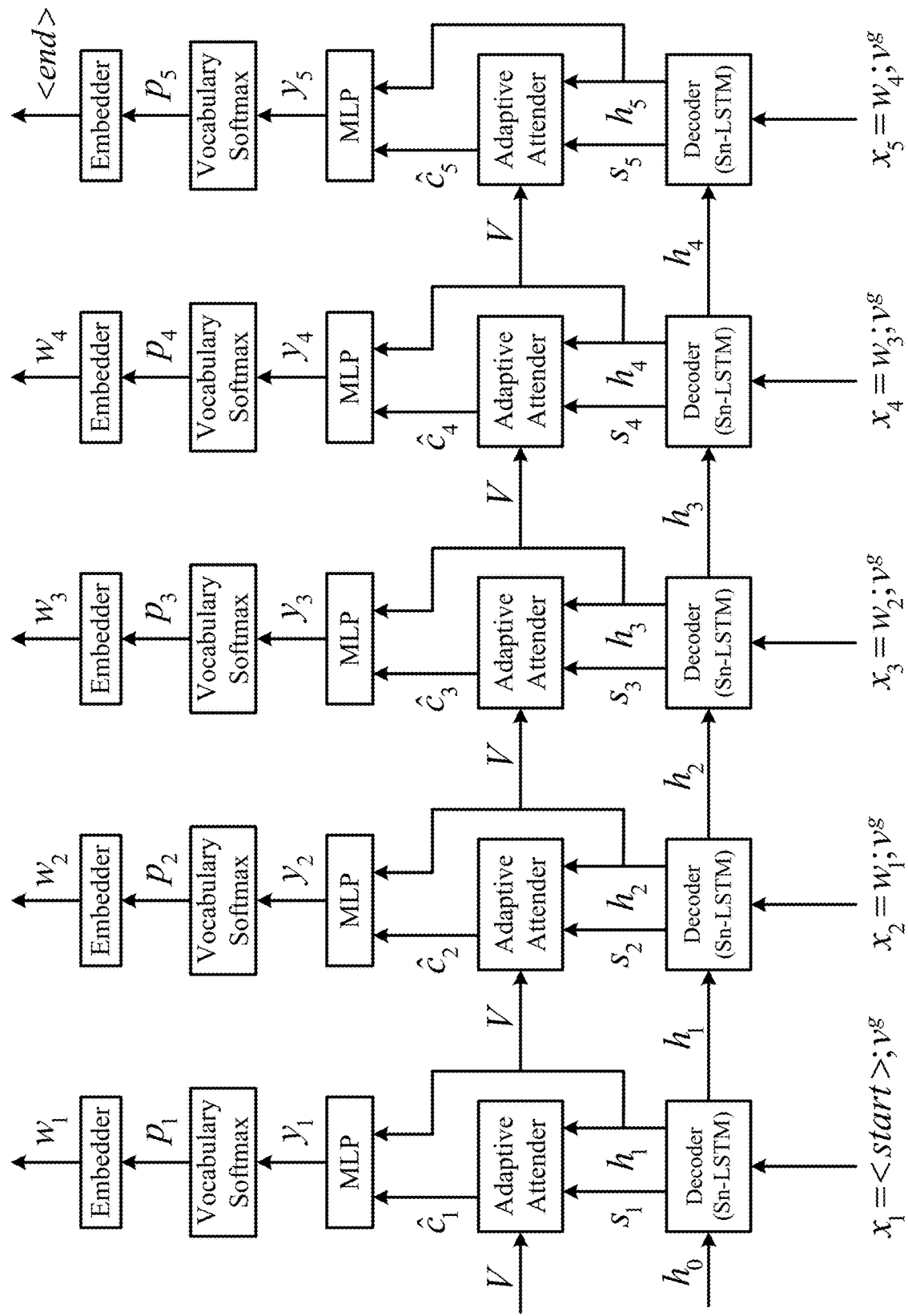
FIG. 12 – Adaptive Attention Model (rolled-across-timesteps)

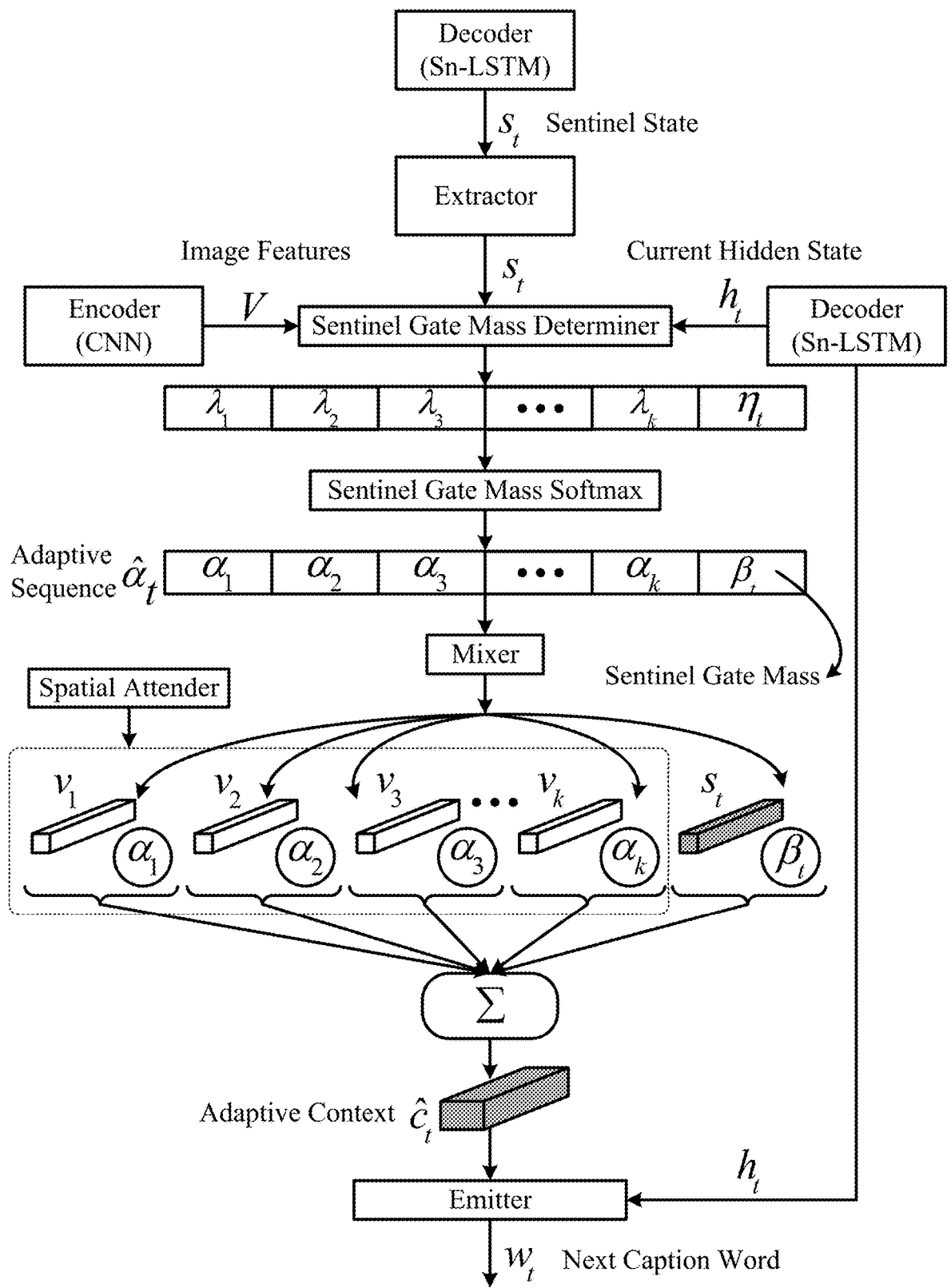
FIG. 13 – Adaptive Attention

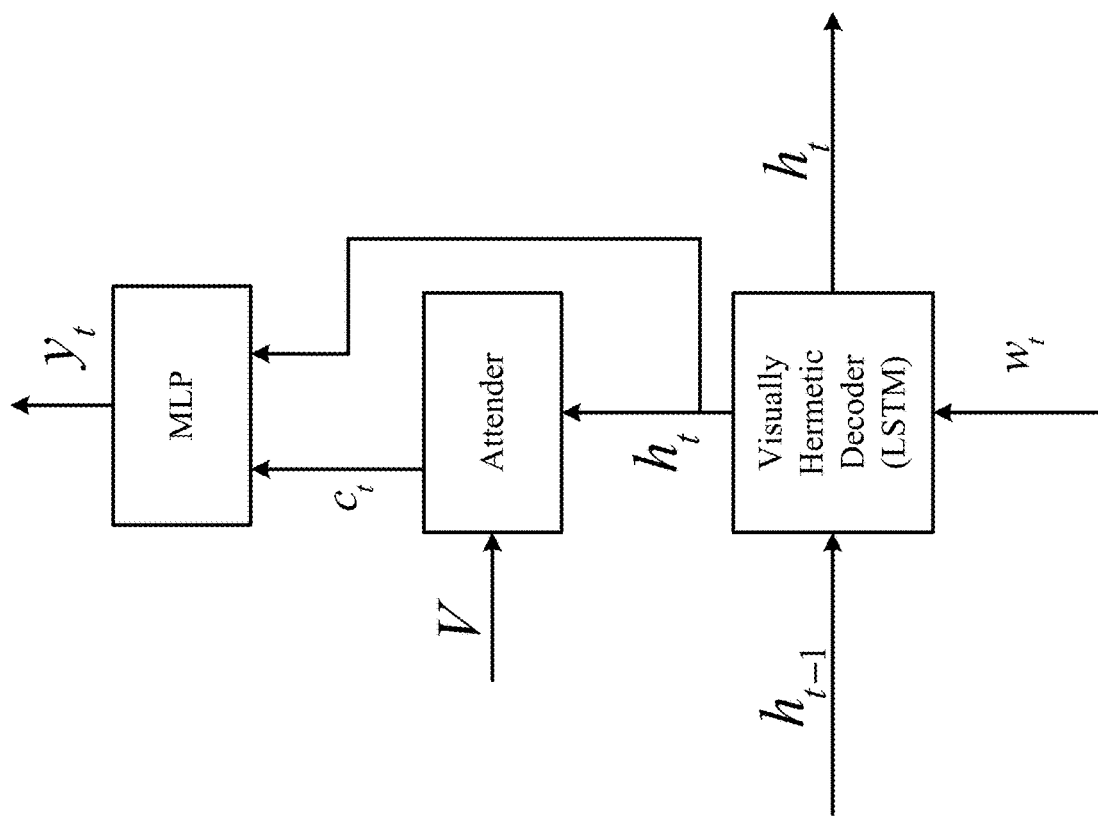
FIG. 14 – Visually Hermetic Decoder

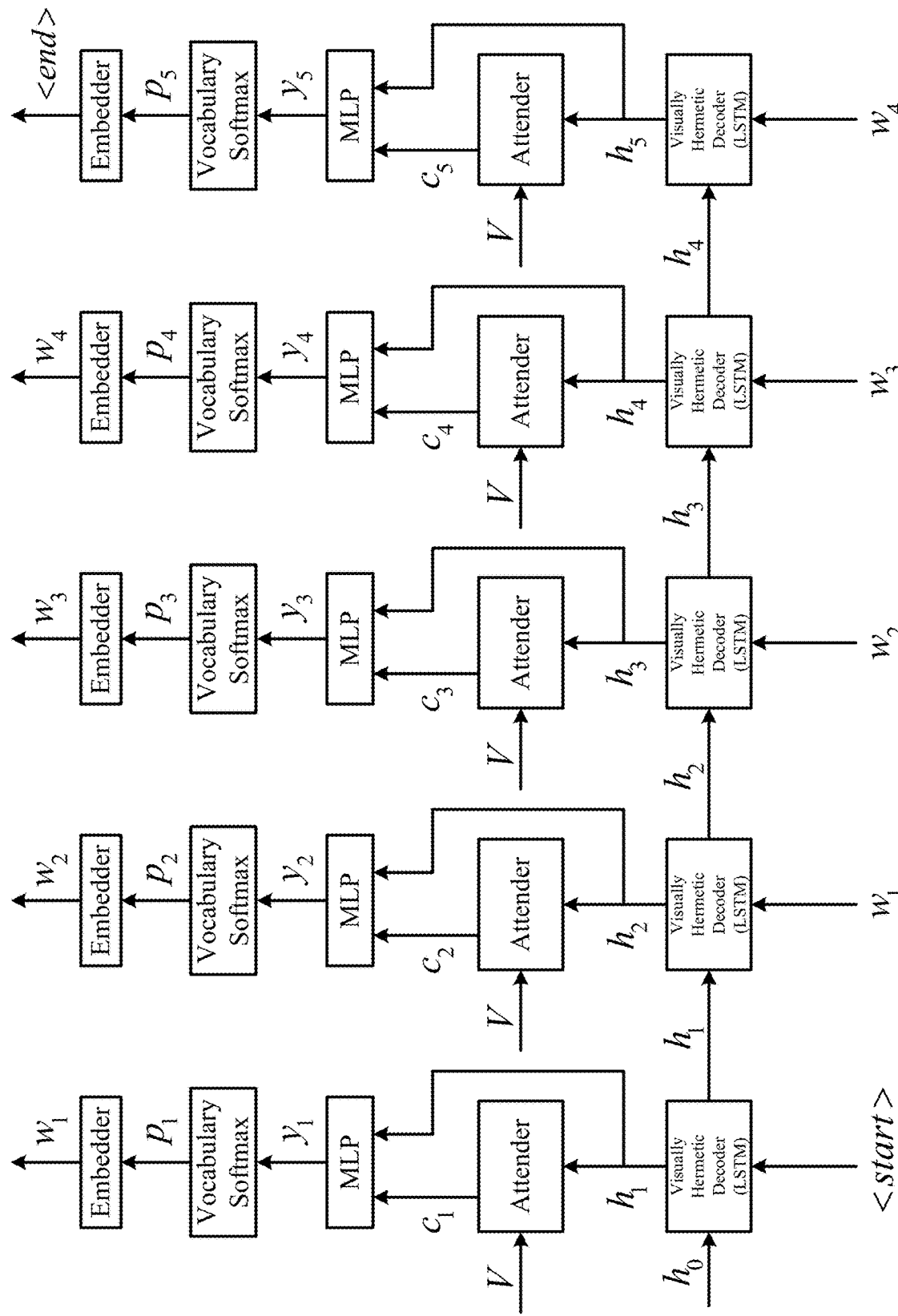
FIG. 15 – Spatial Attention Model Using Visually Hermetic Decoder (rolled-across-timesteps)

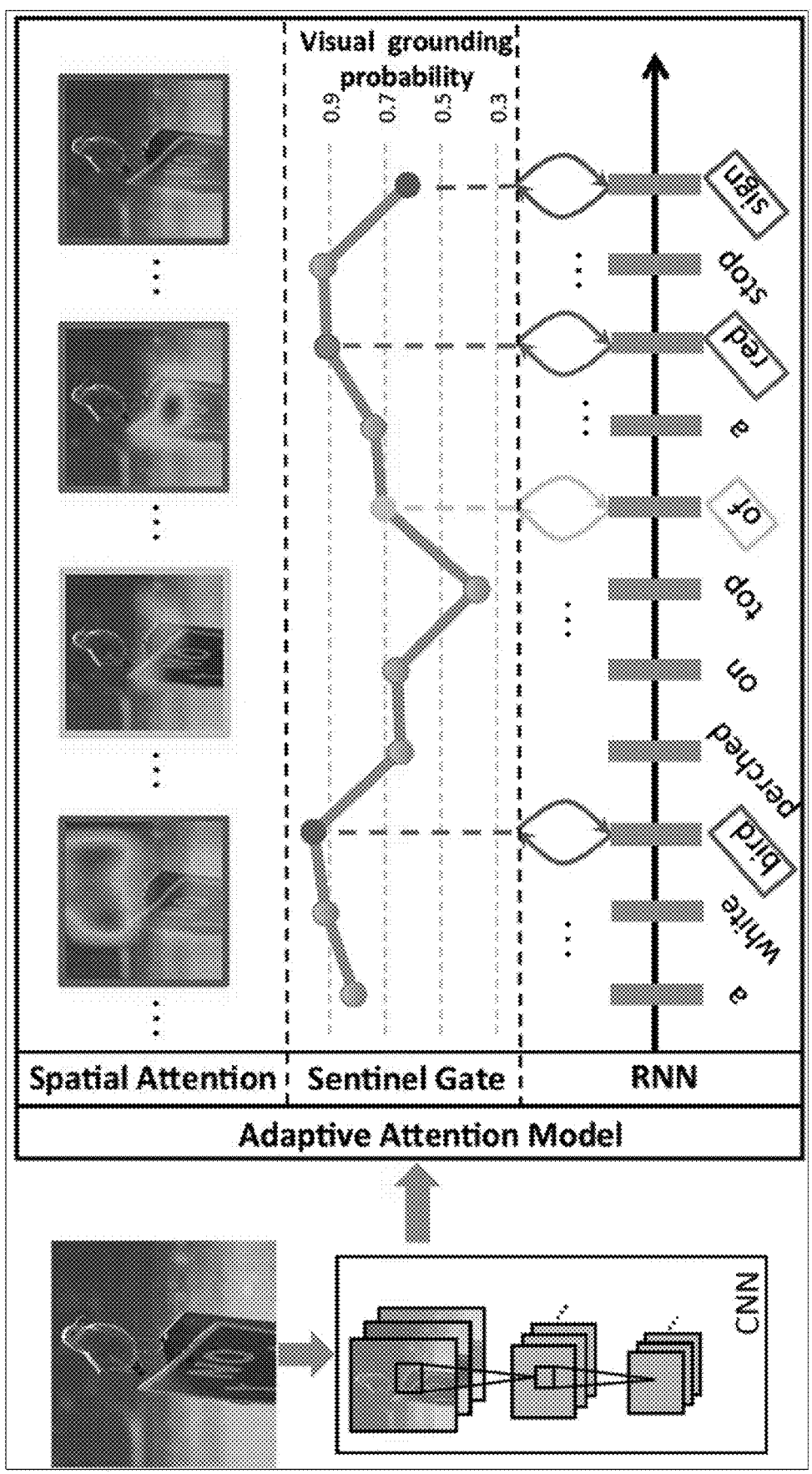
FIG. 16 – Image Captioning Example

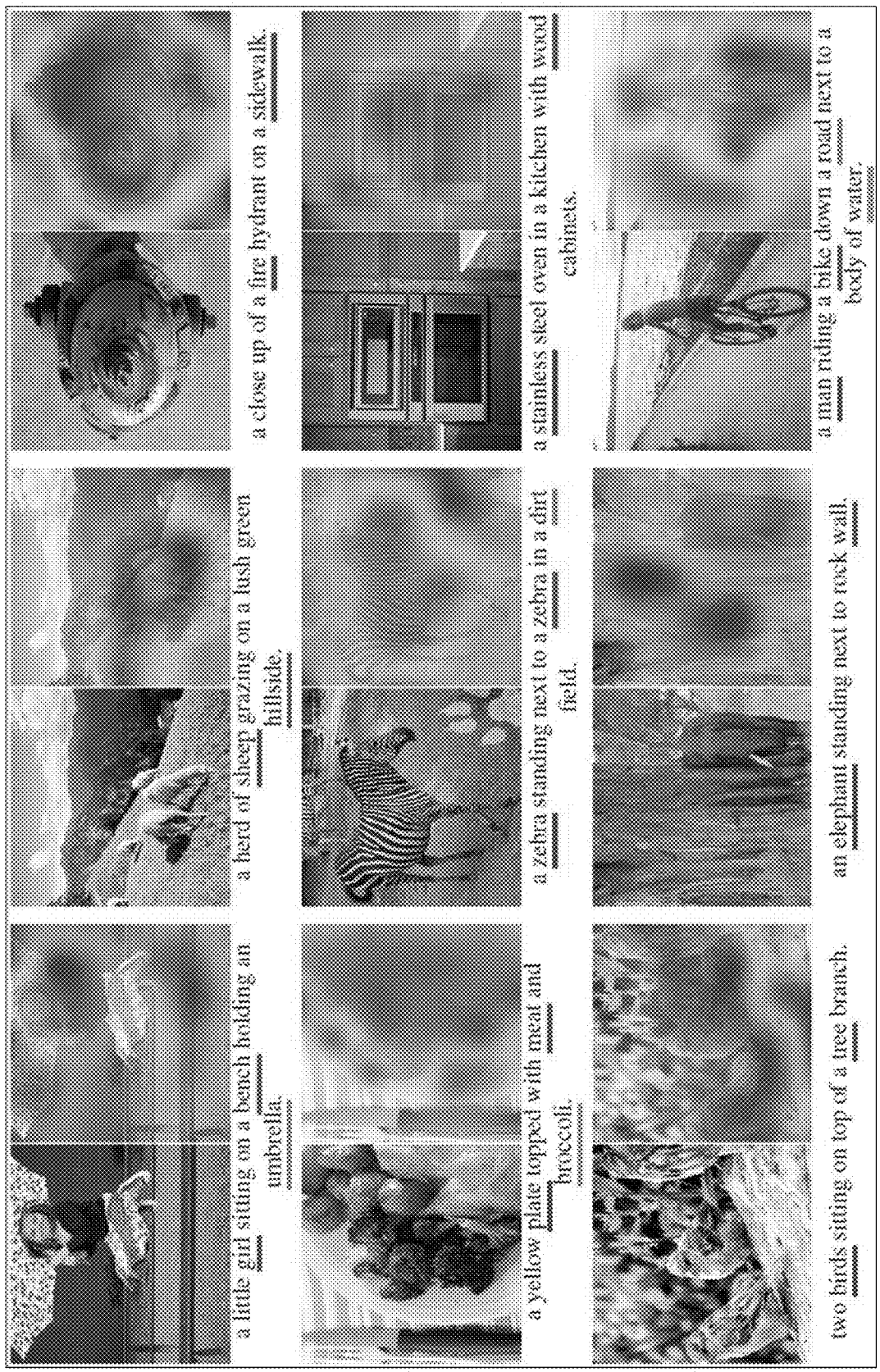
FIG. 17 – Visualization of Generated Captions & Attention Maps on COCO dataset

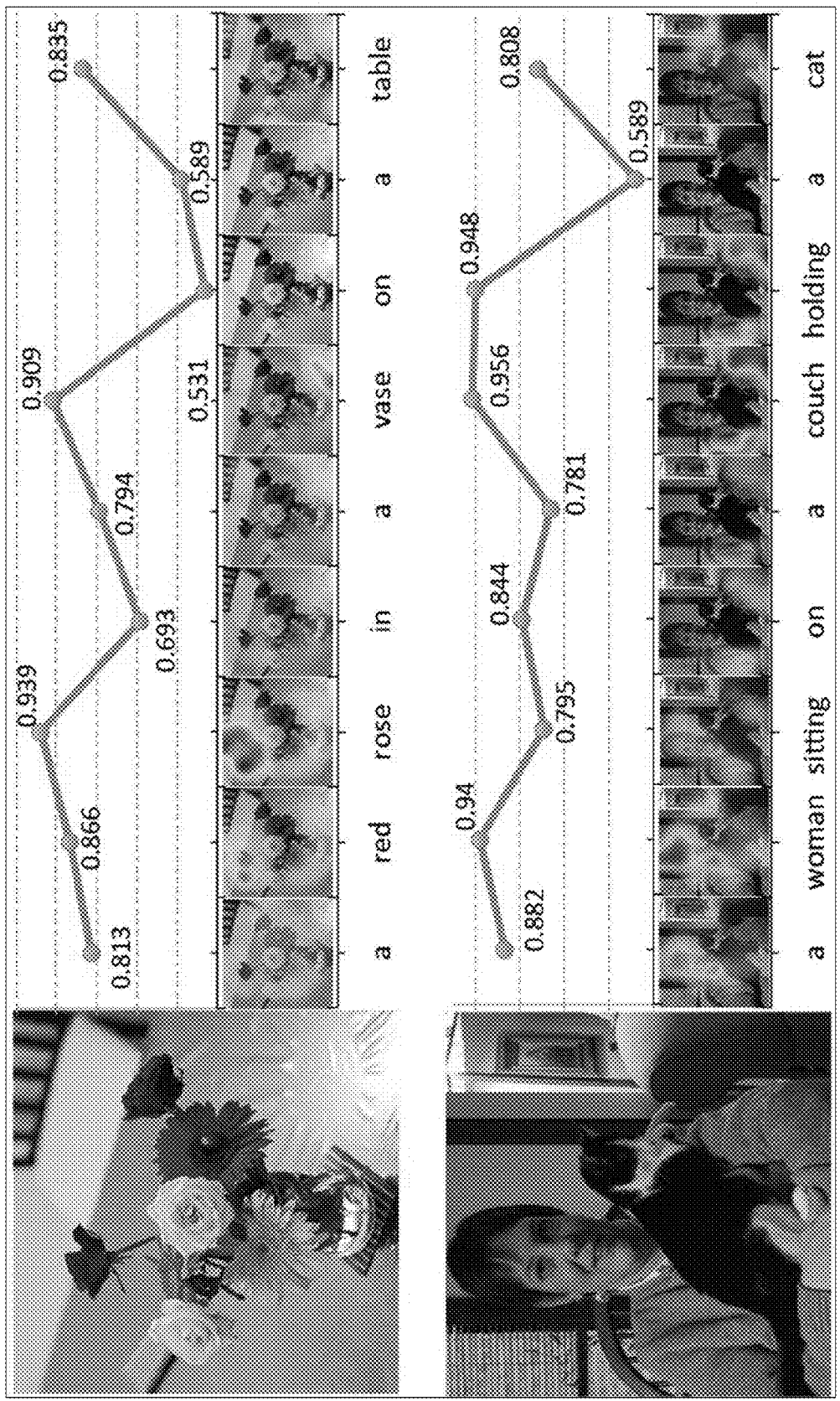
FIG. 18 – Visualization of Generated Captions, Visual Grounding Probabilities, & Attention Maps

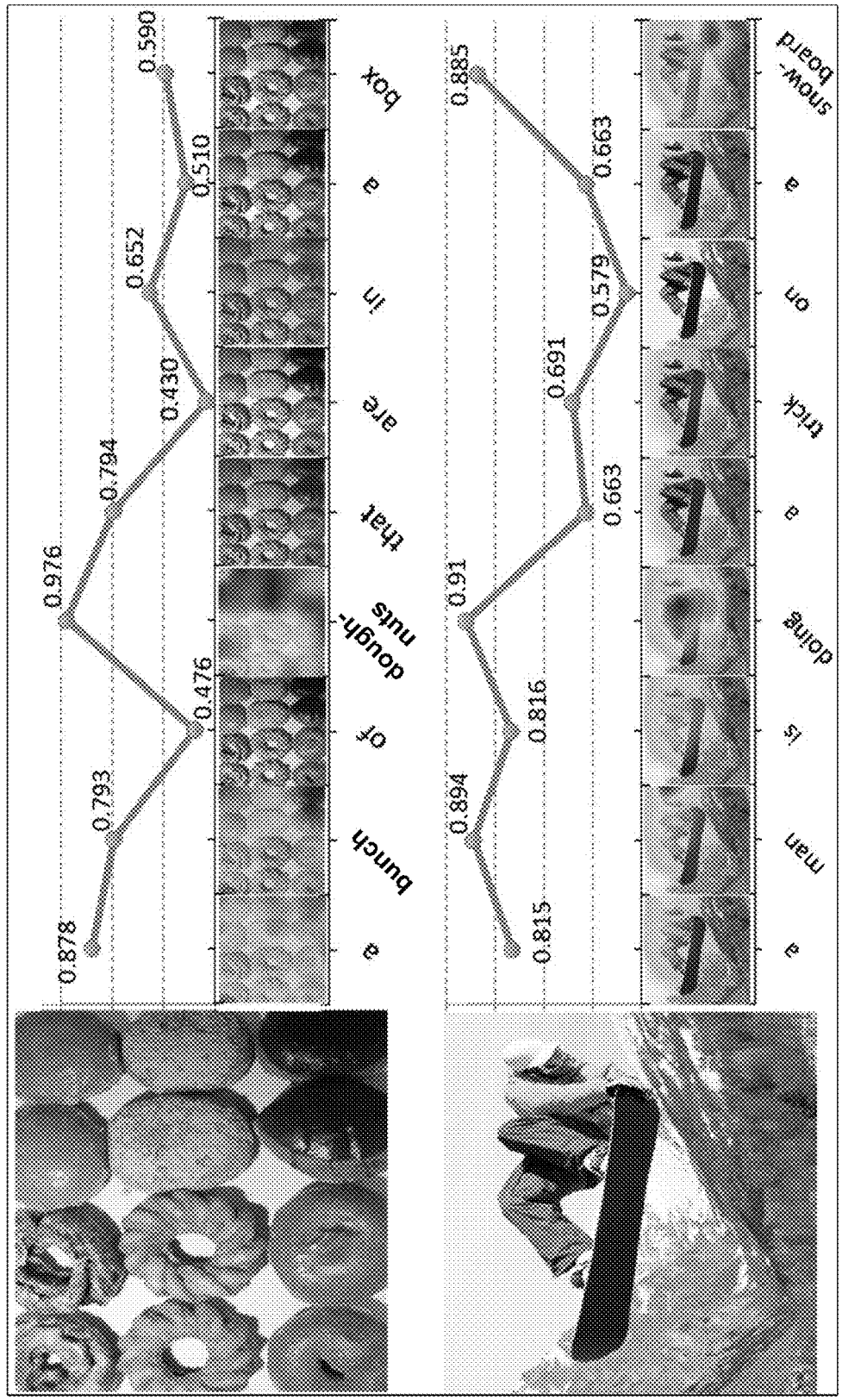
FIG. 19 – Visualization of Generated Captions, Visual Grounding Probabilities, & Attention Maps

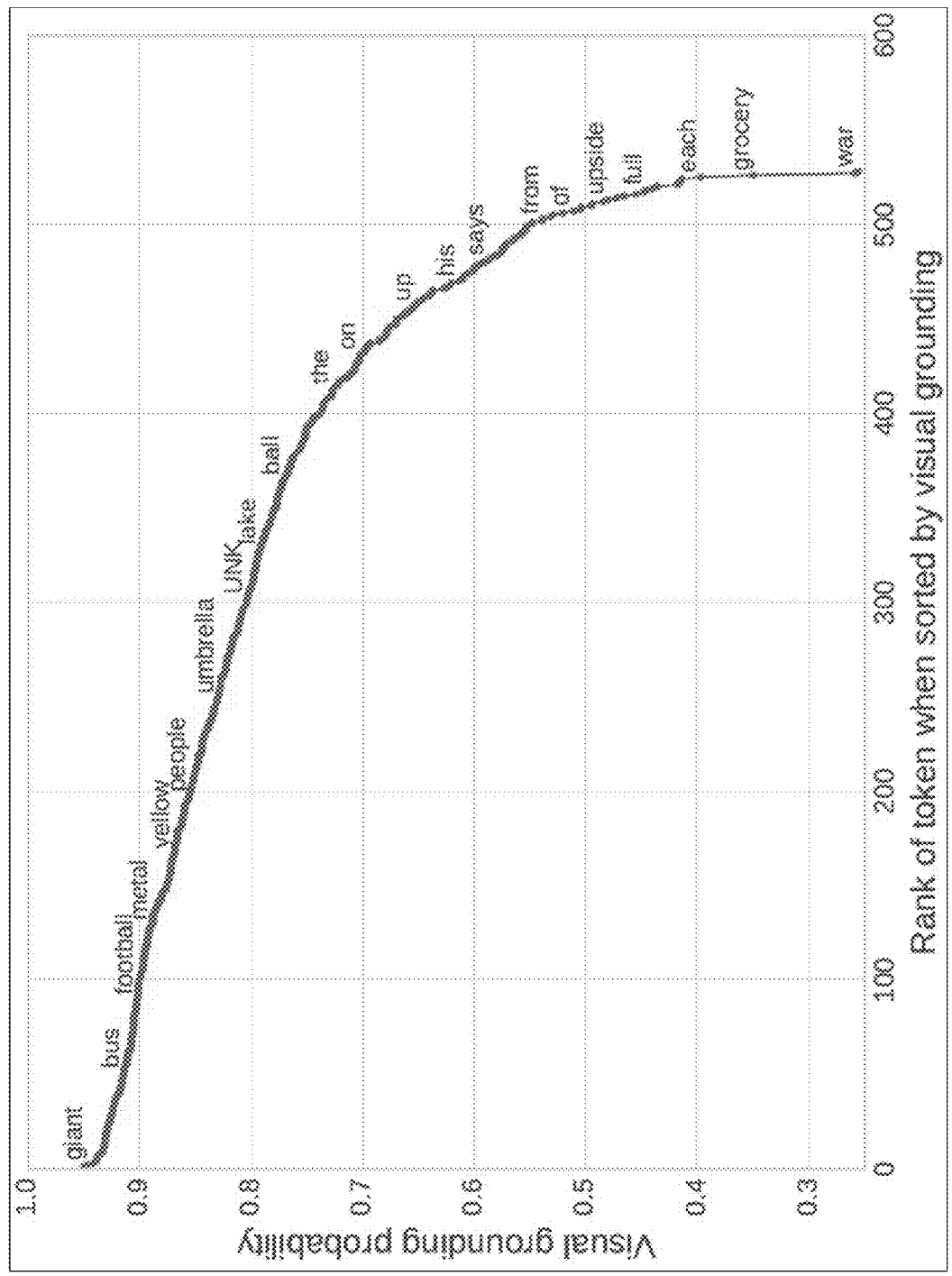
FIG. 20 – Rank-Probability Plot on COCO Dataset

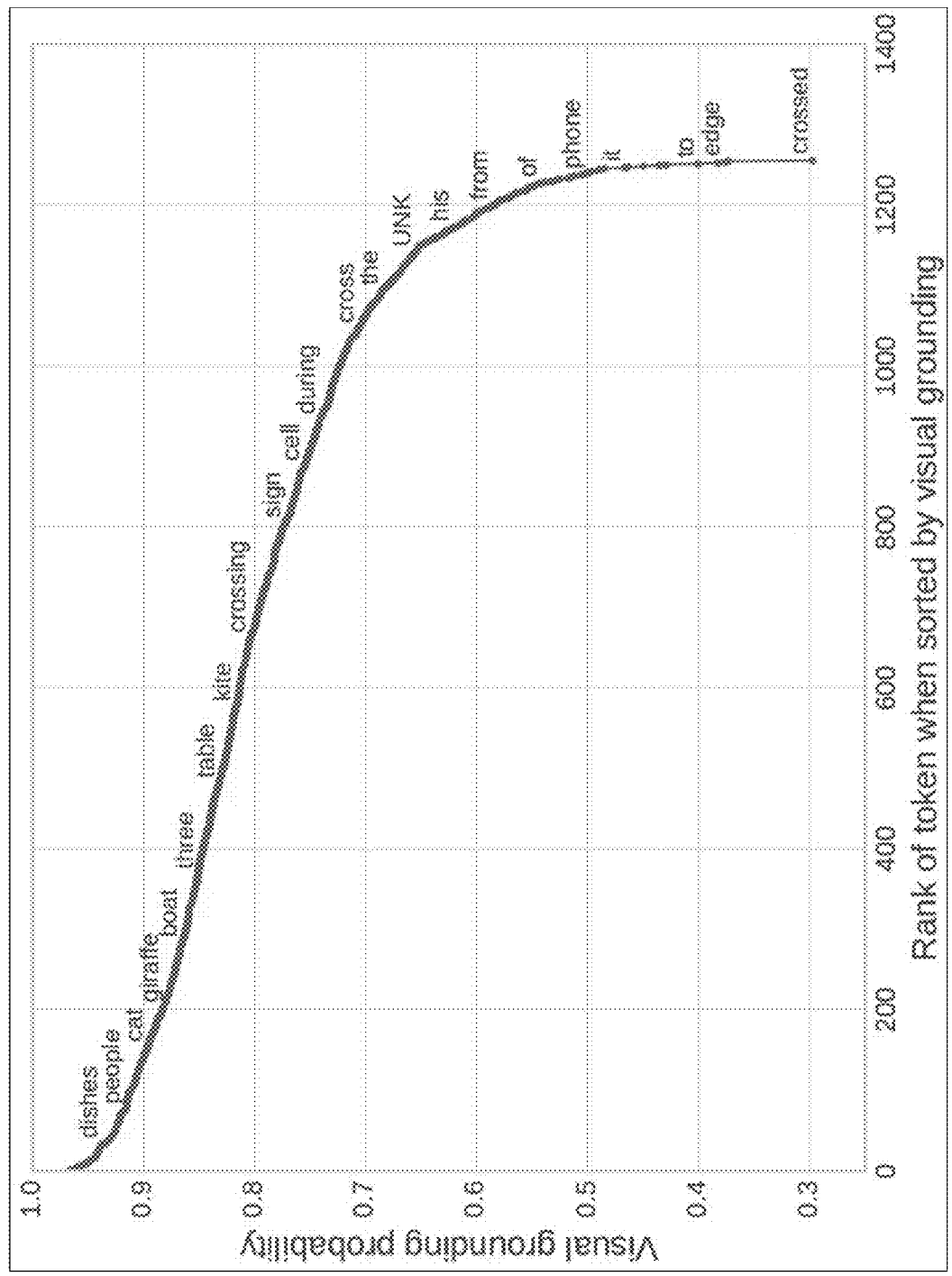
FIG. 21 – Rank-Probability Plot on Flickr30k Dataset

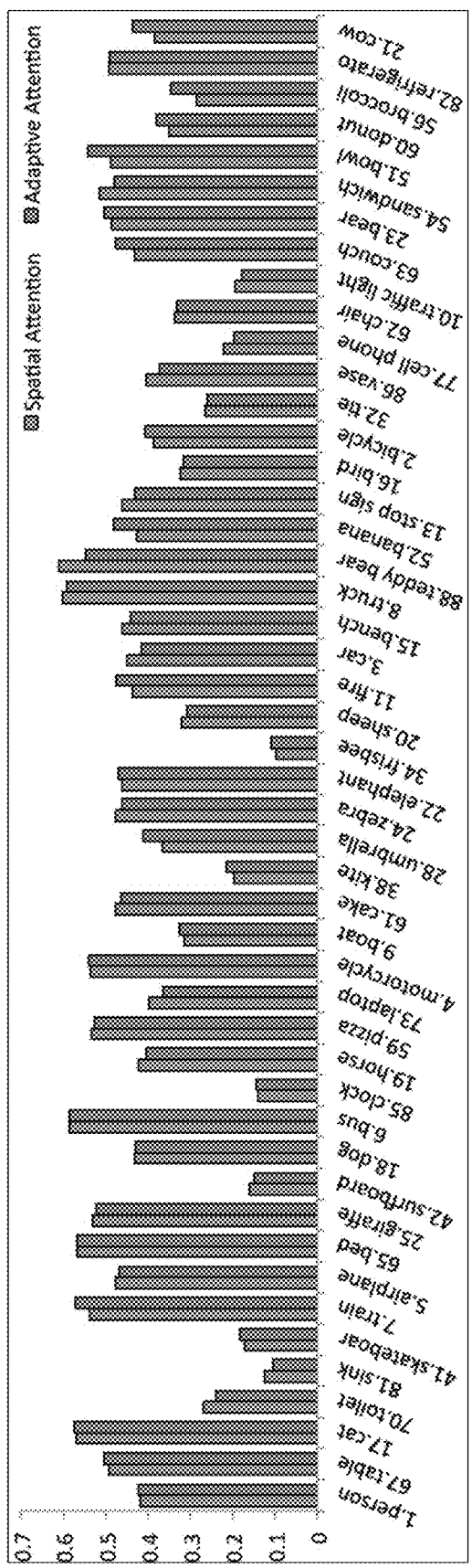
FIG. 22 – Localization Accuracy over Generated Captions

| Method | Flickr30k | | | | | | MS-COCO | | | | | |
|---|---|---|---|---|---|---|---|---|---|---|---|---|
| | B-1 | B-2 | B-3 | B-4 | METEOR | CIDEr | B-1 | B-2 | B-3 | B-4 | METEOR | CIDEr |
| DeepVS [11] | 0.573 | 0.369 | 0.240 | 0.157 | 0.153 | 0.247 | 0.625 | 0.450 | 0.321 | 0.230 | 0.195 | 0.660 |
| Hard-Attention [30] | 0.669 | 0.439 | 0.296 | 0.199 | 0.185 | - | 0.718 | 0.504 | 0.357 | 0.250 | 0.230 | - |
| ATT-FCN† [5] | 0.647 | 0.460 | 0.324 | 0.230 | 0.189 | - | 0.709 | 0.537 | 0.402 | 0.304 | 0.243 | - |
| ERD [9] | - | - | - | - | - | - | - | - | - | 0.298 | 0.240 | 0.895 |
| MSM† [39] | - | - | - | - | - | - | 0.730 | 0.565 | 0.429 | 0.325 | 0.251 | 0.986 |
| Ours-Spatial | 0.644 | 0.462 | 0.327 | 0.231 | 0.202 | 0.493 | 0.734 | 0.566 | 0.418 | 0.304 | 0.257 | 1.029 |
| Ours-Adaptive | 0.677 | 0.494 | 0.354 | 0.251 | 0.204 | 0.531 | 0.742 | 0.580 | 0.439 | 0.332 | 0.266 | 1.085 |

FIG. 23 – Performance on Flickr30k and COCO Dataset

| Method | B-1 | | B-2 | | B-3 | | B-4 | | METEOR | | ROUGE-L | | CIDEr | |
|---|---|---|---|---|---|---|---|---|---|---|---|---|---|---|
| | c5 | c40 | c5 | c40 | c5 | c40 | c5 | c40 | c5 | c40 | c5 | c40 | c5 | c40 |
| Google NIC [27] | 0.713 | 0.895 | 0.542 | 0.802 | 0.407 | 0.694 | 0.309 | 0.587 | 0.254 | 0.346 | 0.530 | 0.682 | 0.943 | 0.946 |
| MS Captivator [8] | 0.715 | 0.907 | 0.543 | 0.819 | 0.407 | 0.710 | 0.308 | 0.601 | 0.248 | 0.339 | 0.526 | 0.680 | 0.931 | 0.937 |
| m-RNN [1] | 0.716 | 0.890 | 0.545 | 0.798 | 0.404 | 0.687 | 0.299 | 0.575 | 0.242 | 0.325 | 0.521 | 0.666 | 0.917 | 0.935 |
| LRCN [7] | 0.718 | 0.895 | 0.548 | 0.804 | 0.409 | 0.695 | 0.306 | 0.585 | 0.247 | 0.335 | 0.528 | 0.678 | 0.921 | 0.934 |
| Hard-Attention [30] | 0.705 | 0.881 | 0.528 | 0.779 | 0.383 | 0.658 | 0.277 | 0.537 | 0.241 | 0.322 | 0.516 | 0.654 | 0.865 | 0.893 |
| ATT-FCN [34] | 0.731 | 0.900 | 0.565 | 0.815 | 0.424 | 0.709 | 0.316 | 0.599 | 0.250 | 0.335 | 0.535 | 0.682 | 0.943 | 0.958 |
| ERD [3] | 0.720 | 0.900 | 0.550 | 0.812 | 0.414 | 0.705 | 0.313 | 0.597 | 0.256 | 0.347 | 0.533 | 0.686 | 0.965 | 0.969 |
| MSM [33] | 0.739 | 0.919 | 0.575 | 0.842 | 0.436 | 0.740 | 0.330 | 0.632 | 0.256 | 0.035 | 0.542 | 0.700 | 0.984 | 1.003 |
| Ours-Adaptive | 0.746 | 0.918 | 0.582 | 0.842 | 0.443 | 0.740 | 0.335 | 0.633 | 0.264 | 0.359 | 0.550 | 0.706 | 1.037 | 1.051 |

FIG. 24 – State-of-the-Art Leaderboard

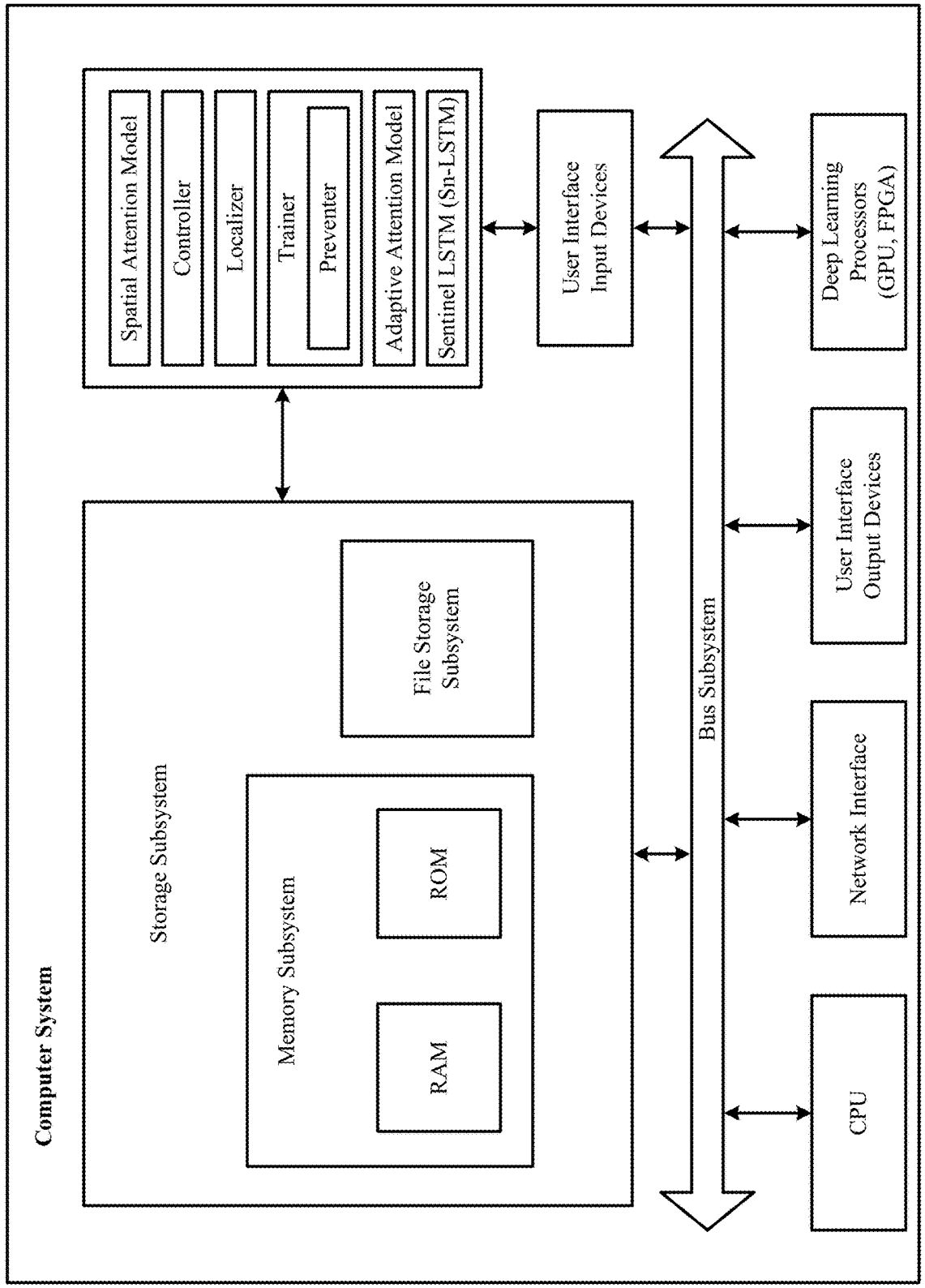
FIG. 25 – Computer System ic # SENTINEL GATE FOR MODULATING AUXILIARY INFORMATION IN A LONG SHORT-TERM MEMORY (LSTM) NEURAL NETWORK

CROSS REFERENCE TO OTHER APPLICATIONS

This application claims the benefit of U.S. Provisional Patent Application No. 62/424,353, entitled "KNOWING WHEN TO LOOK: ADAPTIVE ATTENTION VIA A VISUAL SENTINEL FOR IMAGE CAPTIONING", filed on Nov. 18, 2016. The priority provisional application is hereby incorporated by reference for all purposes;

This application is related to U.S. Nonprovisional patent application Ser. No. 15/817,153, filed Nov. 17, 2017, entitled "SPATIAL ATTENTION MODEL FOR IMAGE CAPTIONING" filed contemporaneously herewith, which is hereby incorporated by reference for all purposes;

This application is related to U.S. Nonprovisional patent application Ser. No. 15/817,161, filed Nov. 17, 2017, entitled "ADAPTIVE ATTENTION MODEL FOR IMAGE CAPTIONING", filed contemporaneously herewith, which is hereby incorporated by reference for all purposes;

This application incorporates by reference for all purposes U.S. Nonprovisional patent application Ser. No. 15/421,016, entitled "POINTER SENTINEL MIXTURE MODELS", filed on Jan. 31, 2017;

This application incorporates by reference for all purposes U.S. Provisional Patent Application No. 62/417,334, entitled "QUASI-RECURRENT NEURAL NETWORK", filed on Nov. 4, 2016;

This application incorporates by reference for all purposes U.S. Nonprovisional patent application Ser. No. 15/420,710, entitled "QUASI-RECURRENT NEURAL NETWORK", filed on Jan. 31, 2017; and This application incorporates by reference for all purposes U.S. Provisional Patent Application No. 62/418,075, entitled "QUASI-RECURRENT NEURAL NETWORK", filed on Nov. 4, 2016.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. The technology disclosed generally relates to a novel visual attention-based encoder-decoder image captioning model. One aspect of the technology disclosed relates to a novel spatial attention model for extracting spatial image features during image captioning. The spatial attention model uses current hidden state information of a decoder long short-term memory (LSTM) to guide attention, rather than using a previous hidden state or a previously emitted word. Another aspect of the technology disclosed relates to a novel adaptive attention model for image captioning that mixes visual information from a convolutional neural network (CNN) and linguistic information from an LSTM. At each timestep, the adaptive attention model automatically decides how heavily to rely on the image, as opposed to the linguistic model, to emit the next caption word. Yet another aspect of the technology disclosed relates to adding a new auxiliary sentinel gate to an LSTM architecture and producing a sentinel LSTM (Sn-LSTM). The sentinel gate produces a visual sentinel at each timestep, which is an additional representation, derived from the LSTM's memory, of long and short term visual and linguistic information.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Image captioning is drawing increasing interest in computer vision and machine learning. Basically, it requires machines to automatically describe the content of an image using a natural language sentence. While this task seems obvious for human-beings, it is complicated for machines since it requires the language model to capture various semantic features within an image, such as objects' motions and actions. Another challenge for image captioning, especially for generative models, is that the generated output should be human-like natural sentences.

Recent successes of deep neural networks in machine translation have catalyzed the adoption of neural networks in solving image captioning problems. The idea originates from the encoder-decoder architecture in neural machine translation, where a convolutional neural network (CNN) is adopted to encode the input image into feature vectors, and a sequence modeling approach (e.g., long short-term memory (LSTM)) decodes the feature vectors into a sequence of words.

Most recent work in image captioning relies on this structure, and leverages image guidance, attributes, region attention, or text attention as the attention guide. FIG. 2A shows an attention leading decoder that uses previous hidden state information to guide attention and generate an image caption (prior art).

Therefore, an opportunity arises to improve the performance of attention-based image captioning models.

Automatically generating captions for images has emerged as a prominent interdisciplinary research problem in both academia and industry. It can aid visually impaired users, and make it easy for users to organize and navigate through large amounts of typically unstructured visual data. In order to generate high quality captions, an image captioning model needs to incorporate fine-grained visual clues from the image. Recently, visual attention-based neural encoder-decoder models have been explored, where the attention mechanism typically produces a spatial map highlighting image regions relevant to each generated word.

Most attention models for image captioning and visual question answering attend to the image at every timestep, irrespective of which word is going to be emitted next. However, not all words in the caption have corresponding visual signals. Consider the example in FIG. 16 that shows an image and its generated caption "a white bird perched on top of a red stop sign". The words "a" and "of" do not have corresponding canonical visual signals. Moreover, linguistic correlations make the visual signal unnecessary when generating words like "on" and "top" following "perched", and "sign" following "a red stop". Furthermore, training with non-visual words can lead to worse performance in generating captions because gradients from non-visual words could mislead and diminish the overall effectiveness of the visual signal in guiding the caption generation process.

Therefore, an opportunity arises to determine the importance that should be given to the target image during caption generation by an attention-based visual neural encoder-decoder model.

Deep neural networks (DNNs) have been successfully applied to many areas, including speech and vision. On natural language processing tasks, recurrent neural networks (RNNs) are widely used because of their ability to memorize long-term dependency. A problem of training deep networks, including RNNs, is gradient diminishing and explosion. This problem is apparent when training an RNN. A long short-term memory (LSTM) neural network is an extension of an RNN that solves this problem. In LSTM, a memory cell has linear dependence of its current activity and its past activity. A forget gate is used to modulate the information flow between the past and the current activities. LSTMs also have input and output gates to modulate its input and output.

The generation of an output word in an LSTM depends on the input at the current timestep and the previous hidden state. However, LSTMs have been configured to condition their output on auxiliary inputs, in addition to the current input and the previous hidden state. For example, in image captioning models, LSTMs incorporate external visual information provided by image features to influence linguistic choices at different stages. As image caption generators, LSTMs take as input not only the most recently emitted caption word and the previous hidden state, but also regional features of the image being captioned (usually derived from the activation values of a hidden layer in a convolutional neural network (CNN)). The LSTMs are then trained to vectorize the image-caption mixture in such a way that this vector can be used to predict the next caption word.

Other image captioning models use external semantic information extracted from the image as an auxiliary input to each LSTM gate. Yet other text summarization and question answering models exist in which a textual encoding of a document or a question produced by a first LSTM is provided as an auxiliary input to a second LSTM.

The auxiliary input carries auxiliary information, which can be visual or textual. It can be generated externally by another LSTM, or derived externally from a hidden state of another LSTM. It can also be provided by an external source such as a CNN, a multilayer perceptron, an attention network, or another LSTM. The auxiliary information can be fed to the LSTM just once at the initial timestep or fed successively at each timestep.

However, feeding uncontrolled auxiliary information to the LSTM can yield inferior results because the LSTM can exploit noise from the auxiliary information and overfit more easily. To address this problem, we introduce an additional control gate into the LSTM that gates and guides the use of auxiliary information for next output generation.

Therefore, an opportunity arises to extend the LSTM architecture to include an auxiliary sentinel gate that determines the importance that should be given to auxiliary information stored in the LSTM for next output generation.

BRIEF DESCRIPTION OF THE DRAWINGS

The patent or application file of the U.S. priority application contains at least one drawing executed in color. Copies of this patent or patent application publication with color drawing(s) will be provided by the U.S. Patent and Trademark Office upon request and payment of the necessary fee. The color drawings are incorporated by reference herein.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1 illustrates an encoder that processes an image through a convolutional neural network (abbreviated CNN) and produces image features for regions of the image.

FIG. 2A shows an attention leading decoder that uses previous hidden state information to guide attention and generate an image caption (prior art).

FIG. 2B shows the disclosed attention lagging decoder which uses current hidden state information to guide attention and generate an image caption.

FIG. 3A depicts a global image feature generator that generates a global image feature for an image by combining image features produced by the CNN encoder of FIG. 1.

FIG. 3B is a word embedder that vectorizes words in a high-dimensional embedding space.

FIG. 3C is an input preparer that prepares and provides input to a decoder.

FIG. 4 depicts one implementation of modules of an attender that is part of the spatial attention model disclosed in FIG. 6.

FIG. 5 shows one implementation of modules of an emitter that is used in various aspects of the technology disclosed. Emitter comprises a feed-forward neural network (also referred to herein as multilayer perceptron (MLP)), a vocabulary softmax (also referred to herein as vocabulary probability mass producer), and a word embedder (also referred to herein as embedder).

FIG. 6 illustrates the disclosed spatial attention model for image captioning rolled across multiple timesteps. The attention lagging decoder of FIG. 2B is embodied in and implemented by the spatial attention model.

FIG. 7 depicts one implementation of image captioning using spatial attention applied by the spatial attention model of FIG. 6.

FIG. 8 illustrates one implementation of the disclosed sentinel LSTM (Sn-LSTM) that comprises an auxiliary sentinel gate which produces a sentinel state.

FIG. 9 shows one implementation of modules of a recurrent neural network (abbreviated RNN) that implements the Sn-LSTM of FIG. 8.

FIG. 10 depicts the disclosed adaptive attention model for image captioning that automatically decides how heavily to rely on visual information, as opposed to linguistic information, to emit a next caption word. The sentinel LSTM (Sn-LSTM) of FIG. 8 is embodied in and implemented by the adaptive attention model as a decoder.

FIG. 11 depicts one implementation of modules of an adaptive attender that is part of the adaptive attention model disclosed in FIG. 12. The adaptive attender comprises a spatial attender, an extractor, a sentinel gate mass determiner, a sentinel gate mass softmax, and a mixer (also referred to herein as an adaptive context vector producer or an adaptive context producer). The spatial attender in turn comprises an adaptive comparator, an adaptive attender softmax, and an adaptive convex combination accumulator.

FIG. 12 shows the disclosed adaptive attention model for image captioning rolled across multiple timesteps. The sentinel LSTM (Sn-LSTM) of FIG. 8 is embodied in and implemented by the adaptive attention model as a decoder.

FIG. 13 illustrates one implementation of image captioning using adaptive attention applied by the adaptive attention model of FIG. 12.

FIG. 14 is one implementation of the disclosed visually hermetic decoder that processes purely linguistic information and produces captions for an image.

FIG. 15 shows a spatial attention model that uses the visually hermetic decoder of FIG. 14 for image captioning. In FIG. 15, the spatial attention model is rolled across multiple timesteps.

FIG. 16 illustrates one example of image captioning using the technology disclosed.

FIG. 17 shows visualization of some example image captions and image/spatial attention maps generated using the technology disclosed.

FIG. 18 depicts visualization of some example image captions, word-wise visual grounding probabilities, and corresponding image/spatial attention maps generated using the technology disclosed.

FIG. 19 illustrates visualization of some other example image captions, word-wise visual grounding probabilities, and corresponding image/spatial attention maps generated using the technology disclosed.

FIG. 20 is an example rank-probability plot that illustrates performance of the technology disclosed on the COCO (common objects in context) dataset.

FIG. 21 is another example rank-probability plot that illustrates performance of the technology disclosed on the Flicker30k dataset.

FIG. 22 is an example graph that shows localization accuracy of the technology disclosed on the COCO dataset. The blue colored bars show localization accuracy of the spatial attention model and the red colored bars show localization accuracy of the adaptive attention model.

FIG. 23 is a table that shows performance of the technology disclosed on the Flicker30k and COCO datasets based on various natural language processing metrics, including BLEU (bilingual evaluation understudy), METEOR (metric for evaluation of translation with explicit ordering), CIDEr (consensus-based image description evaluation), ROUGE-L (recall-oriented understudy for gisting evaluation-longest common subsequence), and SPICE (semantic propositional image caption evaluation).

FIG. 24 is a leaderboard of the published state-of-the-art that shows that the technology disclosed sets the new state-of-the-art by a significant margin.

FIG. 25 is a simplified block diagram of a computer system that can be used to implement the technology disclosed.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other embodiments and applications without departing from the spirit and scope of the technology disclosed. Thus, the technology disclosed is not intended to be limited to the implementations shown, but is to be accorded the widest scope consistent with the principles and features disclosed herein.

What follows is a discussion of the neural encoder-decoder framework for image captioning, followed by the disclosed attention-based image captioning models.

Encoder-Decoder Model for Image Captioning

Attention-based visual neural encoder-decoder models use a convolutional neural network (CNN) to encode an input image into feature vectors and a long short-term memory network (LSTM) to decode the feature vectors into a sequence of words. The LSTM relies on an attention mechanism that produces a spatial map that highlights image regions relevant for generating words. Attention-based models leverage either previous hidden state information of the LSTM or previously emitted caption word(s) as input to the attention mechanism.

Given an image and the corresponding caption, the encoder-decoder model directly maximizes the following objective:

$$\theta^* = \underset{\theta}{\operatorname{argmax}} \sum_{(I,y)} \log p(y \mid I; \theta)$$

In the above equation (1), are the parameters of the model, I is the image, and $y=\{y_1, \ldots y_t\}$ is the corresponding caption. Using the chain rule, the log likelihood of the joint probability distribution can be decomposed into the following ordered conditionals:

$$\log p(y) = \sum_{i=1}^{T} \log p(y_i \mid y_1, \ldots, y_{i-1}, I)$$

As evident by the above equation (2), the dependency on model parameters is dropped for convenience.

In an encoder-decoder framework that uses a recurrent neural network (RNN) as the decoder, each conditional probability is modeled as:

$$\log p(y_t | y_1, \ldots, y_{t-1}, I) = f(h_t, \tilde{c}_t)$$

In the above equation (3), $f$ is a nonlinear function that outputs the probability of $y_t$. $\tilde{c}_t$ is the visual context vector at time t extracted from image I. $h_t$ is the current hidden state of the RNN at time t.

In one implementation, the technology disclosed uses a long short-term memory network (LSTM) as the RNN. LSTMs are gated variants of a vanilla RNN and have demonstrated state-of-the-art performance on a variety of sequence modeling tasks. Current hidden state $h_t$ of the LSTM is modeled as:

$$h_t = \text{LSTM}(x_t, h_{t-1}, m_{t-1})$$

In the above equation (4), $x_t$ is the current input at time t and $m_{t-1}$ is the previous memory cell state at time t−1.

Context vector $\tilde{c}_1$ is an important factor in the neural encoder-decoder framework because it provides visual evidence for caption generation. Different ways of modeling the context vector fall into two categories: vanilla encoder-decoder and attention-based encoder-decoder frameworks. First, in the vanilla framework, context vector $\tilde{c}_t$ is only dependent on a convolutional neural network (CNN) that serves as the encoder. The input image I is fed into the CNN, which extracts the last fully connected layer as a global image feature. Across generated words, the context vector $\tilde{c}_t$ keeps constant, and does not depend on the hidden state of the decoder.

Second, in the attention-based framework, context vector $\tilde{c}_t$ is dependent on both the encoder and the decoder. At time t, based on the hidden state, the decoder attends to specific regions of the image and determines context vector $\tilde{c}_t$ using the spatial image features from a convolution layer of a CNN. Attention models can significantly improve the performance of image captioning.

Spatial Attention Model

We disclose a novel spatial attention model for image captioning that is different from previous work in at least two aspects. First, our model uses the current hidden state information of the decoder LSTM to guide attention, instead of using the previous hidden state or a previously emitted word. Second, our model supplies the LSTM with a time-invariant global image representation, instead of a progression by timestep of attention-variant image representations.

The attention mechanism of our model uses current instead of prior hidden state information to guide attention, which requires a different structure and different processing steps. The current hidden state information is used to guide attention to image regions and generate, in a timestep, an attention-variant image representation. The current hidden state information is computed at each timestep by the decoder LSTM, using a current input and previous hidden state information. Information from the LSTM, the current hidden state, is fed to the attention mechanism, instead of output of the attention mechanism being fed to the LSTM.

The current input combines word(s) previously emitted with a time-invariant global image representation, which is determined from the encoder CNN's image features. The first current input word fed to decoder LSTM is a special start (<start>) token. The global image representation can be fed to the LSTM once, in a first timestep, or repeatedly at successive timesteps.

The spatial attention model determines context vector $c_t$ that is defined as:

$$c_t = g(V, h_t)$$

In the above equation (5), g is the attention function which is embodied in and implemented by the attender of FIG. 4, $V=[v_1, \ldots v_k]$, $v_i \in \mathbb{R}^d$ comprises the image features $v_1, \ldots v_k$ produced by the CNN encoder of FIG. 1. Each image feature is a d dimensional representation corresponding to a part or region of the image produced by the CNN encoder. $h_t$ is the current hidden state of the LSTM decoder at time t, shown in FIG. 2B.

Given the image features $V \in \mathbb{R}^{d \times k}$ produced by the CNN encoder and current hidden state $h_t \in \mathbb{R}^d$ of the LSTM decoder, the disclosed spatial attention model feeds them through a comparator (FIG. 4) followed by an attender softmax (FIG. 4) to generate the attention distribution over the k regions of the image:

$$z_t = w_h^T \tanh(W_v V + (W_g h_t) 1^T)$$

$$\alpha_t = \mathrm{softmax}(z_t)$$

In the above equations (6) and (7), $1 \in \mathbb{R}^k$ is a unity vector with all elements set to 1. $W_v$, $W_g \in \mathbb{R}^{k \times d}$, and $W_h \in \mathbb{R}^k$ are parameters that are learnt. $\alpha \in \mathbb{R}^k$ is the attention weight over image features $v_1, \ldots v_k$ in V and $\alpha_t$ denotes an attention map that comprises the attention weights (also referred to herein as the attention probability masses). As shown in FIG. 4, the comparator comprises a single layer neural network and a nonlinearity layer to determine $z_t$.

Based on the attention distribution, the context vector $c_t$ is obtained by a convex combination accumulator as:

$$c_t = \sum_{i=1}^{k} \alpha_{ti} v_{ti}$$

In the above equation (8), $c_t$ and $h_t$ are combined to predict next word $y_t$ as in equation (3) using an emitter.

As shown in FIG. 4, the attender comprises the comparator, the attender softmax (also referred to herein as attention probability mass producer), and the convex combination accumulator (also referred to herein as context vector producer or context producer).

Encoder-CNN

FIG. 1 illustrates an encoder that processes an image through a convolutional neural network (abbreviated CNN) and produces the image features $V=[v_1, \ldots v_k]$, $v_i \in \mathbb{R}^d$ for regions of the image. In one implementation, the encoder CNN is a pretrained ResNet. In such an implementation, the image features $V=[v_1, \ldots v_k]$, $v_i \in \mathbb{R}^d$ are spatial feature outputs of the last convolutional layer of the ResNet. In one implementation, the image features $V=[v_1, \ldots v_k]$, $v_i \in \mathbb{R}^d$ have a dimension of 2048×7×7. In one implementation, the technology disclosed uses $A=\{a_1, \ldots a_k\}$, $a_i \in \mathbb{R}^{2048}$ to represent the spatial CNN features at each of the k grid locations. Following this, in some implementations, a global image feature generator produces a global image feature, as discussed below.

Attention Lagging Decoder-LSTM

Different from FIG. 2A, FIG. 2B shows the disclosed attention lagging decoder which uses current hidden state information $h_t$ to guide attention and generate an image caption. The attention lagging decoder uses current hidden state information $h_t$ to analyze where to look in the image, i.e., for generating the context vector $c_t$. The decoder then combines both sources of information $h_t$ and $c_t$ to predict the next word. The generated context vector $c_t$ embodies the residual visual information of current hidden state $h_t$, which diminishes the uncertainty or complements the informativeness of the current hidden state for next word prediction. Since the decoder is recurrent, LSTM-based and operates sequentially, the current hidden state $h_t$ embodies the previous hidden state $h_{t-1}$ and the current input $x_t$, which form the current visual and linguistic context. The attention lagging decoder attends to the image using this current visual and linguistic context rather than stale, prior context (FIG. 2A). In other words, the image is attended after the current visual and linguistic context is determined by the decoder, i.e., the attention lags the decoder. This produces more accurate image captions.

Global Image Feature Generator

FIG. 3A depicts a global image feature generator that generates a global image feature for an image by combining image features produced by the CNN encoder of FIG. 1. Global image feature generator first produces a preliminary global image feature as follows:

$$a^g = \frac{1}{k} \sum_{i=1}^{k} a_i$$

In the above equation (9), $a^g$ is the preliminary global image feature that is determined by averaging the image features produced by the CNN encoder. For modeling convenience, the global image feature generator uses a single layer perceptron with rectifier activation function to transform the image feature vectors into new vectors with dimension z d:

$$v_i = ReLU(W_a a_i)$$

$$v^g = ReLU(W_b a^g)$$

In the above equations (10) and (11), $W_a$ and $W_b$ are the weight parameters. $v^g$ is the global image feature. Global image feature $v^g$ is time-invariant because it is not sequentially or recurrently produced, but instead determined from non-recurrent, convolved image features. The transformed spatial image features $v_i$ form the image features $V=[v_1, \ldots v_k]$, $v_i \in \mathbb{R}^d$. Transformation of the image features is embodied in and implemented by the image feature rectifier of the global image feature generator, according to one implementation. Transformation of the preliminary global image feature is embodied in and implemented by the global image feature rectifier of the global image feature generator, according to one implementation.

Word Embedder

FIG. 3B is a word embedder that vectorizes words in a high-dimensional embedding space. The technology disclosed uses the word embedder to generate word embeddings of vocabulary words predicted by the decoder. $w_t$ denotes word embedding of a vocabulary word predicted by the decoder at time t. $w_{t-1}$ denotes word embedding of a vocabulary word predicted by the decoder at time t−1. In one implementation, word embedder generates word embeddings $w_{t-1}$ of dimensionality d using an embedding matrix $E \in \mathbb{R}^{d \times |v|}$, where v represents the size of the vocabulary. In another implementation, word embedder first transforms a word into a one-hot encoding and then converts it into a continuous representation using the embedding matrix $E \in \mathbb{R}^{d \times |v|}$. In yet another implementation, the word embedder initializes word embeddings using pretrained word embedding models like GloVe and word2vec and obtains a fixed word embedding of each word in the vocabulary. In other implementations, word embedder generates character embeddings and/or phrase embeddings.

Input Preparer

FIG. 3C is an input preparer that prepares and provides input to a decoder. At each time step, the input preparer concatenates the word embedding vector $w_{t-1}$ (predicted by the decoder in an immediately previous timestep) with the global image feature vector $v^g$. The concatenation $w_t;v^g$ forms the input $x_t$ that is fed to the decoder at a current timestep t. $w_{t-1}$ denotes the most recently emitted caption word. The input preparer is also referred to herein as concatenator.

Sentinel LSTM (Sn-LSTM)

A long short-term memory (LSTM) is a cell in a neural network that is repeatedly exercised in timesteps to produce sequential outputs from sequential inputs. The output is often referred to as a hidden state, which should not be confused with the cell's memory. Inputs are a hidden state and memory from a prior timestep and a current input. The cell has an input activation function, memory, and gates. The input activation function maps the input into a range, such as −1 to 1 for a tan h activation function. The gates determine weights applied to updating the memory and generating a hidden state output result from the memory. The gates are a forget gate, an input gate, and an output gate. The forget gate attenuates the memory. The input gate mixes activated inputs with the attenuated memory. The output gate controls hidden state output from the memory. The hidden state output can directly label an input or it can be processed by another component to emit a word or other label or generate a probability distribution over labels.

An auxiliary input can be added to the LSTM that introduces a different kind of information than the current input, in a sense orthogonal to current input. Adding such a different kind of auxiliary input can lead to overfitting and other training artifacts. The technology disclosed adds a new gate to the LSTM cell architecture that produces a second sentinel state output from the memory, in addition to the hidden state output. This sentinel state output is used to control mixing between different neural network processing models in a post-LSTM component. A visual sentinel, for instance, controls mixing between analysis of visual features from a CNN and of word sequences from a predictive language model. The new gate that produces the sentinel state output is called "auxiliary sentinel gate".

The auxiliary input contributes to both accumulated auxiliary information in the LSTM memory and to the sentinel output. The sentinel state output encodes parts of the accumulated auxiliary information that are most useful for next output prediction. The sentinel gate conditions current input, including the previous hidden state and the auxiliary information, and combines the conditioned input with the updated memory, to produce the sentinel state output. An LSTM that includes the auxiliary sentinel gate is referred to herein as a "sentinel LSTM (Sn-LSTM)".

Also, prior to being accumulated in the Sn-LSTM, the auxiliary information is often subjected to a "tan h" (hyperbolic tangent) function that produces output in the range of −1 and 1 (e.g., tan h function following the fully-connected layer of a CNN). To be consistent with the output ranges of the auxiliary information, the auxiliary sentinel gate gates the pointwise tan h of the Sn-LSTM's memory cell. Thus, tan h is selected as the non-linearity function applied to the Sn-LSTM's memory cell because it matches the form of the stored auxiliary information.

FIG. 8 illustrates one implementation of the disclosed sentinel LSTM (Sn-LSTM) that comprises an auxiliary sentinel gate which produces a sentinel state or visual sentinel. The Sn-LSTM receives inputs at each of a plurality of timesteps. The inputs include at least an input for a current timestep $x_t$, a hidden state from a previous timestep $h_{t-1}$, and an auxiliary input for the current timestep $a_t$. The Sn-LSTM can run on at least one of the numerous parallel processors.

In some implementations, the auxiliary input $a_t$ is not separately provided, but instead encoded as auxiliary information in the previous hidden state $h_{t-1}$ and/or the input $x_t$ (such as the global image feature $v^g$).

The auxiliary input $a_t$ can be visual input comprising image data and the input can be a text embedding of a most recently emitted word and/or character. The auxiliary input $a_t$ can be a text encoding from another long short-term memory network (abbreviated LSTM) of an input document and the input can be a text embedding of a most recently emitted word and/or character. The auxiliary input $a_t$ can be a hidden state vector from another LSTM that encodes sequential data and the input can be a text embedding of a most recently emitted word and/or character. The auxiliary input $a_t$ can be a prediction derived from a hidden state vector from another LSTM that encodes sequential data and the input can be a text embedding of a most recently emitted word and/or character. The auxiliary input $a_t$ can be an output of a convolutional neural network (abbreviated CNN). The auxiliary input $a_t$ can be an output of an attention network.

The Sn-LSTM generates outputs at each of the plurality of timesteps by processing the inputs through a plurality of gates. The gates include at least an input gate, a forget gate, an output gate, and an auxiliary sentinel gate. Each of the gates can run on at least one of the numerous parallel processors.

The input gate controls how much of the current input $x_t$ and the previous hidden state $h_{t-1}$ will enter the current memory cell state $m_t$ and is represented as:

$$i_t = \sigma(W_{xi}x_t + W_{hi}h_{t-1} + b_i) = \sigma(linear_{xi}(x_t) + linear_{hi}(h_{t-1}))$$

The forget gate operates on the current memory cell state $m_t$ and the previous memory cell state $m_{t-1}$ and decides whether to erase (set to zero) or keep individual components of the memory cell and is represented as:

$$f_t = \sigma(W_{xf}x_t + W_{hf}h_{t-1} + b_f)$$

The output gate scales the output from the memory cell and is represented as:

$$o_t = \sigma(W_{xo}x_t + W_{ho}h_{t-1} + b_o)$$

The Sn-LSTM can also include an activation gate (also referred to as cell update gate or input transformation gate) that transforms the current input $x_t$ and previous hidden state $h_{t-1}$ to be taken into account into the current memory cell state $m_t$ and is represented as:

$$g_t = \tan h(W_{xg}x_t + W_{hg}h_{t-1} + b_g)$$

The Sn-LSTM can also include a current hidden state producer that outputs the current hidden state $h_t$ scaled by a tan h (squashed) transformation of the current memory cell state $m_t$ and is represented as:

$$h_t = o_t \odot \tan h(m_t)$$

In the above equation, $\odot$ represents the element-wise product.

A memory cell updater (FIG. 9) updates the memory cell of the Sn-LSTM from the previous memory cell state $m_{t-1}$ to the current memory cell state $m_t$ as follows:

$$m_t = f_t \odot m_{t-1} + i_t \odot g_t$$

As discussed above, the auxiliary sentinel gate produces a sentinel state or visual sentinel which is a latent representation of what the Sn-LSTM decoder already knows. The Sn-LSTM decoder's memory stores both long and short term visual and linguistic information. The adaptive attention model learns to extract a new component from the Sn-LSTM that the model can fall back on when it chooses to not attend to the image. This new component is called the visual sentinel. And the gate that decides whether to attend to the image or to the visual sentinel is the auxiliary sentinel gate.

The visual and linguistic contextual information is stored in the Sn-LSTM decoder's memory cell. We use the visual sentinel vector $s_t$ to modulate this information by:

$$aux_t = \sigma(W_{xaux}x_t + W_{haux}h_{t-1} + b_{aux})$$

$$s_t = aux_t \odot \tan h(m_t)$$

In the above equations, $W_x$ and $W_h$ are weight parameters that are learned, $x_t$ is the input to the Sn-LSTM at timestep t, and $aux_t$ is the auxiliary sentinel gate applied to the current memory cell state $m_t$. $\odot$ represents the element-wise product and $\sigma$ is the logistic sigmoid activation.

In an attention-based encoder-decoder text summarization model, the Sn-LSTM can be used as a decoder that receives auxiliary information from another encoder LSTM. The encoder LSTM can process an input document to produce a document encoding. The document encoding or an alternative representation of the document encoding can be fed to the Sn-LSTM as auxiliary information. Sn-LSTM can use its auxiliary sentinel gate to determine which parts of the document encoding (or its alternative representation) are most important at a current timestep, considering a previously generated summary word and a previous hidden state. The important parts of the document encoding (or its alternative representation) can then be encoded into the sentinel state. The sentinel state can be used to generate the next summary word.

In an attention-based encoder-decoder question answering model, the Sn-LSTM can be used as a decoder that receives auxiliary information from another encoder LSTM. The encoder LSTM can process an input question to produce a question encoding. The question encoding or an alternative representation of the question encoding can be fed to the Sn-LSTM as auxiliary information. Sn-LSTM can use its auxiliary sentinel gate to determine which parts of the question encoding (or its alternative representation) are most important at a current timestep, considering a previously generated answer word and a previous hidden state. The important parts of the question encoding (or its alternative representation) can then be encoded into the sentinel state. The sentinel state can be used to generate the next answer word.

In an attention-based encoder-decoder machine translation model, the Sn-LSTM can be used as a decoder that receives auxiliary information from another encoder LSTM. The encoder LSTM can process a source language sequence to produce a source encoding. The source encoding or an alternative representation of the source encoding can be fed to the Sn-LSTM as auxiliary information. Sn-LSTM can use its auxiliary sentinel gate to determine which parts of the source encoding (or its alternative representation) are most important at a current timestep, considering a previously generated translated word and a previous hidden state. The important parts of the source encoding (or its alternative representation) can then be encoded into the sentinel state. The sentinel state can be used to generate the next translated word.

In an attention-based encoder-decoder video captioning model, the Sn-LSTM can be used as a decoder that receives auxiliary information from an encoder comprising a CNN and an LSTM. The encoder can process video frames of a video to produce a video encoding. The video encoding or an alternative representation of the video encoding can be fed to the Sn-LSTM as auxiliary information. Sn-LSTM can use its auxiliary sentinel gate to determine which parts of the video encoding (or its alternative representation) are most important at a current timestep, considering a previously generated caption word and a previous hidden state. The important parts of the video encoding (or its alternative representation) can then be encoded into the sentinel state. The sentinel state can be used to generate the next caption word.

In an attention-based encoder-decoder image captioning model, the Sn-LSTM can be used as a decoder that receives auxiliary information from an encoder CNN. The encoder can process an input image to produce an image encoding. The image encoding or an alternative representation of the image encoding can be fed to the Sn-LSTM as auxiliary information. Sn-LSTM can use its auxiliary sentinel gate to determine which parts of the image encoding (or its alternative representation) are most important at a current timestep, considering a previously generated caption word and a previous hidden state. The important parts of the image encoding (or its alternative representation) can then be encoded into the sentinel state. The sentinel state can be used to generate the next caption word.

Adaptive Attention Model

As discussed above, a long short-term memory (LSTM) decoder can be extended to generate image captions by attending to regions or features of a target image and conditioning word predictions on the attended image features. However, attending to the image is only half of the story; knowing when to look is the other half. That is, not all caption words correspond to visual signals; some words, such as stop words and linguistically correlated words, can be better inferred from textual context.

Existing attention-based visual neural encoder-decoder models force visual attention to be active for every generated word. However, the decoder likely requires little to no visual information from the image to predict non-visual words such as "the" and "of". Other words that seem visual can often be predicted reliably by the linguistic model, e.g., "sign" after "behind a red stop" or "phone" following "talking on a cell". If the decoder needs to generate the compound word "stop sign" as caption, then only "stop" requires access to the image and "sign" can be deduced linguistically. Our technology guides use of visual and linguistic information.

To overcome the above limitations, we disclose a novel adaptive attention model for image captioning that mixes visual information from a convolutional neural network (CNN) and linguistic information from an LSTM. At each timestep, our adaptive attention encoder-decoder framework can automatically decide how heavily to rely on the image, as opposed to the linguistic model, to emit the next caption word.

FIG. 10 depicts the disclosed adaptive attention model for image captioning that automatically decides how heavily to rely on visual information, as opposed to linguistic information, to emit a next caption word. The sentinel LSTM (Sn-LSTM) of FIG. 8 is embodied in and implemented by the adaptive attention model as a decoder.

As discussed above, our model adds a new auxiliary sentinel gate to the LSTM architecture. The sentinel gate produces a so-called visual sentinel/sentinel state $s_t$ at each timestep, which is an additional representation, derived from the Sn-LSTM's memory, of long and short term visual and linguistic information. The visual sentinel $s_t$ encodes information that can be relied on by the linguistic model without reference to the visual information from the CNN. The visual sentinel $s_t$ is used, in combination with the current hidden state from the Sn-LSTM, to generate a sentinel gate mass/gate probability mass $\beta t$ that controls mixing of image and linguistic context.

For example, as illustrated in FIG. 16, our model learns to attend to the image more when generating words "white", "bird", "red" and "stop", and relies more on the visual sentinel when generating words "top", "of" and "sign".

Visually Hermetic Decoder

FIG. 14 is one implementation of the disclosed visually hermetic decoder that processes purely linguistic information and produces captions for an image. FIG. 15 shows a spatial attention model that uses the visually hermetic decoder of FIG. 14 for image captioning. In FIG. 15, the spatial attention model is rolled across multiple timesteps. Alternatively, a visually hermetic decoder can be used that processes purely linguistic information w, which is not mixed with image data during image captioning. This alternative visually hermetic decoder does not receive the global image representation as input. That is, the current input to the visually hermetic decoder is just its most recently emitted caption word $w_{t-1}$ and the initial input is only the <start> token. A visually hermetic decoder can be implemented as an LSTM, a gated recurrent unit (GRU), or a quasi-recurrent neural network (QRNN). Words, with this alternative decoder, are still emitted after application of the attention mechanism.

Weakly-Supervised Localization

The technology disclosed also provides a system and method of evaluating performance of an image captioning model. The technology disclosed generates a spatial attention map of attention values for mixing image region vectors of an image using a convolutional neural network (abbreviated CNN) encoder and a long-short term memory (LSTM) decoder and produces a caption word output based on the spatial attention map. Then, the technology disclosed segments regions of the image above a threshold attention value into a segmentation map. Then, the technology disclosed projects a bounding box over the image that covers a largest connected image component in the segmentation map. Then, the technology disclosed determines an intersection over union (abbreviated IOU) of the projected bounding box and a ground truth bounding box. Then, the technology disclosed determines a localization accuracy of the spatial attention map based on the calculated IOU.

The technology disclosed achieves state-of-the-art performance across standard benchmarks on the COCO dataset and the Flickr30k dataset.

Particular Implementations

We describe a system and various implementations of a visual attention-based encoder-decoder image captioning model. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

In one implementation, the technology disclosed presents a system. The system includes numerous parallel processors coupled to memory. The memory is loaded with computer instructions to generate a natural language caption for an image. The instructions, when executed on the parallel processors, implement the following actions.

Processing an image through an encoder to produce image feature vectors for regions of the image and determining a global image feature vector from the image feature vectors. The encoder can be a convolutional neural network (abbreviated CNN).

Processing words through a decoder by beginning at an initial timestep with a start-of-caption token <start> and the global image feature vector and continuing in successive timesteps using a most recently emitted caption word $w_{t-1}$ and the global image feature vector as input to the decoder. The decoder can be a long short-term memory network (abbreviated LSTM).

At each timestep, using at least a current hidden state of the decoder to determine unnormalized attention values for the image feature vectors and exponentially normalizing the attention values to produce attention probability masses.

Applying the attention probability masses to the image feature vectors to accumulate in an image context vector a weighted sum of the image feature vectors.

Submitting the image context vector and the current hidden state of the decoder to a feed-forward neural network and causing the feed-forward neural network to emit a next caption word. The feed-forward neural network can be a multilayer perceptron (abbreviated MLP).

Repeating the processing of words through the decoder, the using, the applying, and the submitting until the caption word emitted is an end-of-caption token <end>. The iterations are performed by a controller, shown in FIG. 25.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The system can be a computer-implemented system. The system can be a neural network-based system.

The current hidden state of the decoder can be determined based on a current input to the decoder and a previous hidden state of the decoder.

The image context vector can be a dynamic vector that determines at each timestep an amount of spatial attention allocated to each image region, conditioned on the current hidden state of the decoder.

The system can use weakly-supervised localization to evaluate the allocated spatial attention.

The attention values for the image feature vectors can be determined by processing the image feature vectors and the current hidden state of the decoder through a single layer neural network.

The system can cause the feed-forward neural network to emit the next caption word at each timestep. In such an implementation, the feed-forward neural network can produce an output based on the image context vector and the current hidden state of the decoder and use the output to determine a normalized distribution of vocabulary probability masses over words in a vocabulary that represent a respective likelihood that a vocabulary word is the next caption word.

Other implementations may include a non-transitory computer readable storage medium storing instructions executable by a processor to perform actions of the system described above.

In another implementation, the technology disclosed presents a system. The system includes numerous parallel processors coupled to memory. The memory is loaded with computer instructions to generate a natural language caption for an image. The instructions, when executed on the parallel processors, implement the following actions.

Using current hidden state information of an attention lagging decoder to generate an attention map for image feature vectors produced by an encoder from an image and generating an output caption word based on a weighted sum of the image feature vectors, with the weights determined from the attention map.

Each of the features discussed in this particular implementation section for other system and method implementations apply equally to this system implementation. As indicated above, all the other features are not repeated here and should be considered repeated by reference.

The system can be a computer-implemented system. The system can be a neural network-based system.

The current hidden state information can be determined based on a current input to the decoder and previous hidden state information.

The system can use weakly-supervised localization to evaluate the attention map.

The encoder can be a convolutional neural network (abbreviated CNN) and the image feature vectors can be produced by a last convolutional layer of the CNN.

The attention lagging decoder can be a long short-term memory network (abbreviated LSTM).

Other implementations may include a non-transitory computer readable storage medium storing instructions executable by a processor to perform actions of the system described above.

In yet another implementation, the technology disclosed presents a system. The system includes numerous parallel processors coupled to memory. The memory is loaded with computer instructions to generate a natural language caption for an image. The instructions, when executed on the parallel processors, implement the following actions.

Processing an image through an encoder to produce image feature vectors for regions of the image. The encoder can be a convolutional neural network (abbreviated CNN).

Processing words through a decoder by beginning at an initial timestep with a start-of-caption token <start> and continuing in successive timesteps using a most recently emitted caption word $w_{t-1}$ as input to the decoder. The decoder can be a long short-term memory network (abbreviated LSTM).

At each timestep, using at least a current hidden state of the decoder to determine, from the image feature vectors, an image context vector that determines an amount of attention allocated to regions of the image conditioned on the current hidden state of the decoder.

Not supplying the image context vector to the decoder.

Submitting the image context vector and the current hidden state of the decoder to a feed-forward neural network and causing the feed-forward neural network to emit a caption word.

Repeating the processing of words through the decoder, the using, the not supplying, and the submitting until the caption word emitted is an end-of-caption token <end>. The iterations are performed by a controller, shown in FIG. 25.

Each of the features discussed in this particular implementation section for other system and method implementations apply equally to this system implementation. As indicated above, all the other features are not repeated here and should be considered repeated by reference.

The system can be a computer-implemented system. The system can be a neural network-based system.

The system does not supply the global image feature vector to the decoder and processes words through the decoder by beginning at the initial timestep with the start-of-caption token <start> and continuing in successive timesteps using the most recently emitted caption word $w_{t-1}$ as input to the decoder.

The system does not supply the image feature vectors to the decoder, in some implementations.

In yet further implementation, the technology disclosed presents a system for machine generation of a natural language caption for an image. The system runs on numerous parallel processors. The system can be a computer-implemented system. The system can be a neural network-based system.

The system comprises an attention lagging decoder. The attention lagging decoder can run on at least one of the numerous parallel processors.

The attention lagging decoder uses at least current hidden state information to generate an attention map for image feature vectors produced by an encoder from an image. The encoder can be a convolutional neural network (abbreviated CNN) and the image feature vectors can be produced by a last convolutional layer of the CNN. The attention lagging decoder can be a long short-term memory network (abbreviated LSTM).

The attention lagging decoder causes generation of an output caption word based on a weighted sum of the image feature vectors, with the weights determined from the attention map.

Each of the features discussed in this particular implementation section for other system and method implementations apply equally to this system implementation. As indicated above, all the other features are not repeated here and should be considered repeated by reference.

Other implementations may include a non-transitory computer readable storage medium storing instructions executable by a processor to perform actions of the system described above.

FIG. 6 illustrates the disclosed spatial attention model for image captioning rolled across multiple timesteps. The attention lagging decoder of FIG. 2B is embodied in and implemented by the spatial attention model. The technology disclosed presents an image-to-language captioning system that implements the spatial attention model of FIG. 6 for machine generation of a natural language caption for an image. The system runs on numerous parallel processors.

The system comprises an encoder (FIG. 1) for processing an image through a convolutional neural network (abbreviated CNN) and producing image features for regions of the image. The encoder can run on at least one of the numerous parallel processors.

The system comprises a global image feature generator (FIG. 3A) for generating a global image feature for the image by combining the image features. The global image feature generator can run on at least one of the numerous parallel processors.

The system comprises an input preparer (FIG. 3C) for providing input to a decoder as a combination of a start-of-caption token <start> and the global image feature at an initial decoder timestep and a combination of a most recently emitted caption word $w_{t-1}$ and the global image feature at successive decoder timesteps. The input preparer can run on at least one of the numerous parallel processors.

The system comprises the decoder (FIG. 2B) for processing the input through a long short-term memory network (abbreviated LSTM) to generate a current decoder hidden state at each decoder timestep. The decoder can run on at least one of the numerous parallel processors.

The system comprises an attender (FIG. 4) for accumulating, at each decoder timestep, an image context as a convex combination of the image features scaled by attention probability masses determined using the current decoder hidden state. The attender can run on at least one of the numerous parallel processors. FIG. 4 depicts one implementation of modules of the attender that is part of the spatial attention model disclosed in FIG. 6. The attender comprises the comparator, the attender softmax (also referred to herein as attention probability mass producer), and the convex combination accumulator (also referred to herein as context vector producer or context producer).

The system comprises a feed-forward neural network (also referred to herein as multilayer perceptron (MLP)) (FIG. 5) for processing the image context and the current decoder hidden state to emit a next caption word at each decoder timestep. The feed-forward neural network can run on at least one of the numerous parallel processors.

The system comprises a controller (FIG. 25) for iterating the input preparer, the decoder, the attender, and the feed-forward neural network to generate the natural language caption for the image until the next caption word emitted is an end-of-caption token <end>. The controller can run on at least one of the numerous parallel processors.

Each of the features discussed in this particular implementation section for other system and method implementations apply equally to this system implementation. As indicated above, all the other features are not repeated here and should be considered repeated by reference.

The system can be a computer-implemented system. The system can be a neural network-based system.

The attender can further comprise an attender softmax (FIG. 4) for exponentially normalizing attention values $z_t = [\lambda_1, \ldots \lambda_k]$ to produce the attention probability masses $\alpha_t = [\alpha_1, \ldots \alpha_k]$ at each decoder timestep. The attender softmax can run on at least one of the numerous parallel processors.

The attender can further comprise a comparator (FIG. 4) for producing at each decoder timestep the attention values $z_t = [\lambda_1, \ldots \lambda_k]$ as a result of interaction between the current decoder hidden state $h_t$ and the image features $V = [v_1, \ldots v_k]$, $v_i \in \mathbb{R}^d$. The comparator can run on at least one of the numerous parallel processors. In some implementations, the attention values $z_t = [\lambda_1, \ldots \lambda_k]$ are determined by processing the current decoder hidden state $h_t$ and the image features $V = [v_1, \ldots v_k]$, $v_i \in \mathbb{R}^d$ through a single layer neural network applying a weight matrix and a nonlinearity layer (FIG. 4) applying a hyperbolic tangent (tan h) squashing function (to produce an output between −1 and 1). In some implementations, the attention values $z_t = [\lambda_1, \ldots \lambda_k]$ are determined by processing the current decoder hidden state $h_t$ and the image features $V = [v_1, \ldots v_k]$, $v_i \in \mathbb{R}^d$ through a dot producter or inner producter. In yet other implementations, the attention values $z_t = [\lambda_1, \ldots \lambda_k]$ are determined by processing the current decoder hidden state $h_t$ and the image features $V = [v_1, \ldots v_k]$, $v_i \in \mathbb{R}^d$ through a bilinear form producter.

The decoder can further comprise at least an input gate, a forget gate, and an output gate for determining at each decoder timestep the current decoder hidden state based on a current decoder input and a previous decoder hidden state. The input gate, the forget gate, and the output gate can each run on at least one of the numerous parallel processors.

The attender can further comprise a convex combination accumulator (FIG. 4) for producing the image context to identify an amount of spatial attention allocated to each image region at each decoder timestep, conditioned on the current decoder hidden state. The convex combination accumulator can run on at least one of the numerous parallel processors.

The system can further comprise a localizer (FIG. 25) for evaluating the allocated spatial attention based on weakly-supervising localization. The localizer can run on at least one of the numerous parallel processors.

The system can further comprise the feed-forward neural network (FIG. 5) for producing at each decoder timestep an output based on the image context and the current decoder hidden state.

The system can further comprise a vocabulary softmax (FIG. 5) for determining at each decoder timestep a normalized distribution of vocabulary probability masses over words in a vocabulary using the output. The vocabulary softmax can run on at least one of the numerous parallel processors. The vocabulary probability masses can identify respective likelihood that a vocabulary word is the next caption word.

Other implementations may include a non-transitory computer readable storage medium storing instructions executable by a processor to perform actions of the system described above.

FIG. 7 depicts one implementation of image captioning using spatial attention applied by the spatial attention model of FIG. 6. In one implementation, the technology disclosed presents a method that performs the image captioning of FIG. 7 for machine generation of a natural language caption for an image. The method can be a computer-implemented method. The method can be a neural network-based method.

The method includes processing an image I through an encoder (FIG. 1) to produce image feature vectors $V=[v_1, \ldots v_k]$, $v_i \in \mathbb{R}^d$ for regions of the image I and determining a global image feature vector $v^g$ from the image feature vectors $V=[v_1, \ldots v_k]$, $v_i \in \mathbb{R}^d$. The encoder can be a convolutional neural network (abbreviated CNN), as shown in FIG. 1.

The method includes processing words through a decoder (FIGS. 2B and 6) by beginning at an initial timestep with a start-of-caption token <start> and the global image feature vector $v^g$ and continuing in successive timesteps using a most recently emitted caption word $w_{t-1}$ and the global image feature vector $v^g$ as input to the decoder. The decoder can be a long short-term memory network (abbreviated LSTM), as shown in FIGS. 2B and 6.

The method includes, at each timestep, using at least a current hidden state of the decoder $h_t$ to determine unnormalized attention values $z_t=[\lambda_1, \ldots \lambda_k]$ for the image feature vectors $V=[v_1, \ldots v_k]$, $v_i \in \mathbb{R}^d$ and exponentially normalizing the attention values to produce attention probability masses $\alpha_t=[\alpha_1, \ldots \alpha_k]$ that add to unity (1) (also referred to herein as the attention weights). $\alpha_t$ denotes an attention map that comprises the attention probability masses $[\alpha_1, \ldots \alpha_k]$.

The method includes applying the attention probability masses $[\alpha_1, \ldots \alpha_k]$ to the image feature vectors $V=[v_1, \ldots v_k]$, $v_i \in \mathbb{R}^d$ to accumulate in an image context vector $c_t$ a weighted sum $\Sigma$ of the image feature vectors $V=[v_1, \ldots v_k]$, $v_i \in \mathbb{R}^d$.

The method includes submitting the image context vector $c_t$ and the current hidden state of the decoder $h_t$ to a feed-forward neural network and causing the feed-forward neural network to emit a next caption word $w_t$. The feed-forward neural network can be a multilayer perceptron (abbreviated MLP).

The method includes repeating the processing of words through the decoder, the using, the applying, and the submitting until the caption word emitted is end-of-caption token <end>. The iterations are performed by a controller, shown in FIG. 25.

Each of the features discussed in this particular implementation section for other system and method implementations apply equally to this method implementation. As indicated above, all the other features are not repeated here and should be considered repeated by reference.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above.

In another implementation, the technology disclosed presents a method of machine generation of a natural language caption for an image. The method can be a computer-implemented method. The method can be a neural network-based method.

As shown in FIG. 7, the method includes using current hidden state information $h_t$ of an attention lagging decoder (FIGS. 2B and 6) to generate an attention map $\alpha_t=[\alpha_1, \ldots \alpha_k]$ for image feature vectors $V=[v_1, \ldots v_k]$, $v_i \in \mathbb{R}^d$ produced by an encoder (FIG. 1) from an image I and generating an output caption word $w_t$ based on a weighted sum of the image feature vectors $V=[v_1, \ldots v_k]$, $v_i \in \mathbb{R}^d$ with the weights determined from the attention map $\alpha_t=[\alpha_1, \ldots \alpha_k]$.

Each of the features discussed in this particular implementation section for other system and method implementations apply equally to this method implementation. As indicated above, all the other features are not repeated here and should be considered repeated by reference.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above.

In yet another implementation, the technology disclosed presents a method of machine generation of a natural language caption for an image. This method uses a visually hermetic LSTM. The method can be a computer-implemented method. The method can be a neural network-based method.

The method includes processing an image through an encoder (FIG. 1) to produce image feature vectors $V=[v_1, \ldots v_k]$, $v_i \in \mathbb{R}^d$ for k regions of the image I. The encoder can be a convolutional neural network (abbreviated CNN).

The method includes processing words through a decoder by beginning at an initial timestep with a start-of-caption token <start> and continuing in successive timesteps using a most recently emitted caption word $w_{t-1}$ as input to the decoder. The decoder can be a visually hermetic long short-term memory network (abbreviated LSTM), shown in FIGS. 14 and 15.

The method includes, at each timestep, using at least a current hidden state $h_t$ of the decoder to determine, from the image feature vectors $V=[v_1, \ldots v_k]$, $v_i \in \mathbb{R}^d$ an image context vector $c_t$ that determines an amount of attention allocated to regions of the image conditioned on the current hidden state $h_t$ of the decoder.

The method includes not supplying the image context vector $c_t$ to the decoder.

The method includes submitting the image context vector $c_t$ and the current hidden state of the decoder $h_t$ to a feed-forward neural network and causing the feed-forward neural network to emit a caption word.

The method includes repeating the processing of words through the decoder, the using, the not supplying, and the submitting until the caption word emitted is an end-of-caption.

Each of the features discussed in this particular implementation section for other system and method implementations apply equally to this method implementation. As indicated above, all the other features are not repeated here and should be considered repeated by reference.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above.

FIG. 12 shows the disclosed adaptive attention model for image captioning rolled across multiple timesteps. The sentinel LSTM (Sn-LSTM) of FIG. 8 is embodied in and implemented by the adaptive attention model as a decoder. FIG. 13 illustrates one implementation of image captioning using adaptive attention applied by the adaptive attention model of FIG. 12.

In one implementation, the technology disclosed presents a system that performs the image captioning of FIGS. 12 and 13. The system includes numerous parallel processors coupled to memory. The memory is loaded with computer instructions to automatically caption an image. The instructions, when executed on the parallel processors, implement the following actions.

Mixing Σ results of an image encoder (FIG. 1) and a language decoder (FIG. 8) to emit a sequence of caption words for an input image I. The mixing is governed by a gate probability mass/sentinel gate mass $\beta_t$ determined from a visual sentinel vector $s_t$ of the language decoder and a current hidden state vector of the language decoder $h_t$. The image encoder can be a convolutional neural network (abbreviated CNN). The language decoder can be a sentinel long short-term memory network (abbreviated Sn-LSTM), as shown in FIGS. 8 and 9. The language decoder can be a sentinel bi-directional long short-term memory network (abbreviated Sn—Bi-LSTM). The language decoder can be a sentinel gated recurrent unit network (abbreviated Sn-GRU). The language decoder can be a sentinel quasi-recurrent neural network (abbreviated Sn-QRNN).

Determining the results of the image encoder by processing the image I through the image encoder to produce image feature vectors $V=[v_1, \ldots v_k]$, $v_i \in \mathbb{R}_d$ for k regions of the image I and computing a global image feature vector $v^g$ from the image feature vectors $V=[v_1, \ldots v_k]$, $v_i \in \mathbb{R}^d$.

Determining the results of the language decoder by processing words through the language decoder. This includes—(1) beginning at an initial timestep with a start-of-caption token <start> and the global image feature vector $v^g$, (2) continuing in successive timesteps using a most recently emitted caption word $w_{t-1}$ and the global image feature vector $v^g$ as input to the language decoder, and (3) at each timestep, generating a visual sentinel vector $s_t$ that combines the most recently emitted caption word $w_{t-1}$, the global image feature vector $v^g$, a previous hidden state vector of the language decoder $h_{t-1}$, and memory contents $m_t$ of the language decoder.

At each timestep, using at least a current hidden state vector $h_t$ of the language decoder to determine unnormalized attention values $[\lambda_1, \ldots \lambda_k]$ for the image feature vectors $V=[v_1, \ldots v_k]$, $v_i \in \mathbb{R}^d$ and an unnormalized gate value $[\eta_t]$ for the visual sentinel vector $s_t$.

Concatenating the unnormalized attention values $[\lambda_1, \ldots \lambda_k]$ and the unnormalized gate value $[\eta_t]$ and exponentially normalizing the concatenated attention and gate values to produce a vector of attention probability masses $[\alpha_1, \ldots \alpha_k]$ and the gate probability mass/sentinel gate mass $\beta_t$.

Applying the attention probability masses $[\alpha_1, \ldots \alpha_k]$ to the image feature vectors $V=[v_1, \ldots v_k]$, $v_i \in \mathbb{R}^d$ to accumulate in an image context vector $c_t$ a weighted sum Σ of the image feature vectors $V=[v_1, \ldots v_k]$, $v_i \in \mathbb{R}^d$. The generation of context vector $c_t$ is embodied in and implemented by the spatial attender of the adaptive attender, shown in FIGS. 11 and 13.

Determining an adaptive context vector $\hat{c}_t$ as a mix of the image context vector $c_t$ and the visual sentinel vector $s_t$ according to the gate probability mass/sentinel gate mass $\beta_t$. The generation of adaptive context vector $\hat{c}_t$ is embodied in and implemented by the mixer of the adaptive attender, shown in FIGS. 11 and 13.

Submitting the adaptive context vector and the current hidden state of the language decoder to a feed-forward neural network and causing the feed-forward neural network to emit a next caption word. The feed-forward neural network is embodied in and implemented by the emitter, as shown in FIG. 5.

Repeating the processing of words through the language decoder, the using, the concatenating, the applying, the determining, and the submitting until the next caption word emitted is an end-of-caption token <end>. The iterations are performed by a controller, shown in FIG. 25.

Each of the features discussed in this particular implementation section for other system and method implementations apply equally to this system implementation. As indicated above, all the other features are not repeated here and should be considered repeated by reference.

The system can be a computer-implemented system. The system can be a neural network-based system.

The adaptive context vector $\hat{c}_t$ at timestep t can be determined as $\hat{c}_t = \beta_t s_t + (1-\beta_t) c_t$, where $\hat{c}_t$ denotes the adaptive context vector, $c_t$ denotes the image context vector, $s_t$ denotes the visual sentinel vector, $\beta_t$ denotes the gate probability mass/sentinel gate mass, and $(1-\beta_t)$ denotes visual grounding probability of the next caption word.

The visual sentinel vector st can encode visual sentinel information that includes visual context determined from the global image feature vector $v^g$ and textual context determined from previously emitted caption words.

The gate probability mass/sentinel gate mass/sentinel gate mass $\beta_t$ being unity can result in the adaptive context vector $\hat{c}_t$ being equal to the visual sentinel vector $s_t$. In such an implementation, the next caption word $w_t$ is emitted only in dependence upon the visual sentinel information.

The image context vector $c_t$ can encode spatial image information conditioned on the current hidden state vector $h_t$ of the language decoder.

The gate probability mass/sentinel gate mass $\beta_t$ being zero can result in the adaptive context vector $\hat{c}_t$ being equal to the image context vector $c_t$. In such an implementation, the next caption word $w_t$ is emitted only in dependence upon the spatial image information.

The gate probability mass/sentinel gate mass $\beta_t$ can be a scalar value between unity and zero that enhances when the next caption word $w_t$ is a visual word and diminishes when the next caption word $w_t$ is a non-visual word or linguistically correlated to the previously emitted caption word $w_{t-1}$.

The system can further comprise a trainer (FIG. 25), which in turn further comprises a preventer (FIG. 25). The preventer prevents, during training, backpropagation of gradients from the language decoder to the image encoder when the next caption word is a non-visual word or linguistically correlated to the previously emitted caption word. The trainer and the preventer can each run on at least one of the numerous parallel processors.

Other implementations may include a non-transitory computer readable storage medium storing instructions executable by a processor to perform actions of the system described above.

In one implementation, the technology disclosed presents a method of automatic image captioning. The method can be a computer-implemented method. The method can be a neural network-based method.

The method includes mixing Σ results of an image encoder (FIG. 1) and a language decoder (FIGS. 8 and 9) to emit a sequence of caption words for an input image I. The mixing is embodied in and implemented by the mixer of the adaptive attender of FIG. 11. The mixing is governed by a gate probability mass (also referred to herein as the sentinel gate mass) determined from a visual sentinel vector of the language decoder and a current hidden state vector of the language decoder. The image encoder can be a convolutional neural network (abbreviated CNN). The language decoder can be a sentinel long short-term memory network (abbreviated Sn-LSTM). The language decoder can be a sentinel bi-directional long short-term memory network (abbreviated Sn—Bi-LSTM). The language decoder can be a sentinel gated recurrent unit network (abbreviated Sn-GRU). The language decoder can be a sentinel quasi-recurrent neural network (abbreviated Sn-QRNN).

The method includes determining the results of the image encoder by processing the image through the image encoder to produce image feature vectors for regions of the image and computing a global image feature vector from the image feature vectors.

The method includes determining the results of the language decoder by processing words through the language decoder. This includes—(1) beginning at an initial timestep with a start-of-caption token <start> and the global image feature vector, (2) continuing in successive timesteps using a most recently emitted caption word $w_{t-1}$ and the global image feature vector as input to the language decoder, and (3) at each timestep, generating a visual sentinel vector that combines the most recently emitted caption word $w_{t-1}$, the global image feature vector, a previous hidden state vector of the language decoder, and memory contents of the language decoder.

The method includes, at each timestep, using at least a current hidden state vector of the language decoder to determine unnormalized attention values for the image feature vectors and an unnormalized gate value for the visual sentinel vector.

The method includes concatenating the unnormalized attention values and the unnormalized gate value and exponentially normalizing the concatenated attention and gate values to produce a vector of attention probability masses and the gate probability mass/sentinel gate mass.

The method includes applying the attention probability masses to the image feature vectors to accumulate in an image context vector $c_t$ a weighted sum of the image feature vectors.

The method includes determining an adaptive context vector $\hat{c}_t$ as a mix of the image context vector and the visual sentinel vector $s_t$ according to the gate probability mass/sentinel gate mass $\beta_t$.

The method includes submitting the adaptive context vector $\hat{c}_t$ and the current hidden state of the language decoder $h_t$ to a feed-forward neural network (MLP) and causing the feed-forward neural network to emit a next caption word $w_t$.

The method includes repeating the processing of words through the language decoder, the using, the concatenating, the applying, the determining, and the submitting until the next caption word emitted is an end-of-caption token <end>. The iterations are performed by a controller, shown in FIG. 25.

Each of the features discussed in this particular implementation section for other system and method implementations apply equally to this method implementation. As indicated above, all the other features are not repeated here and should be considered repeated by reference.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above.

In another implementation, the technology disclosed presents an automated image captioning system. The system runs on numerous parallel processors.

The system comprises a convolutional neural network (abbreviated CNN) encoder (FIG. 11). The CNN encoder can run on at least one of the numerous parallel processors. The CNN encoder processes an input image through one or more convolutional layers to generate image features by image regions that represent the image.

The system comprises a sentinel long short-term memory network (abbreviated Sn-LSTM) decoder (FIG. 8). The Sn-LSTM decoder can run on at least one of the numerous parallel processors. The Sn-LSTM decoder processes a previously emitted caption word combined with the image features to emit a sequence of caption words over successive timesteps.

The system comprises an adaptive attender (FIG. 11). The adaptive attender can run on at least one of the numerous parallel processors. At each timestep, the adaptive attender spatially attends to the image features and produces an image context conditioned on a current hidden state of the Sn-LSTM decoder. Then, at each timestep, the adaptive attender extracts, from the Sn-LSTM decoder, a visual sentinel that includes visual context determined from previously processed image features and textual context determined from previously emitted caption words. Then, at each timestep, the adaptive attender mixes the image context $c_t$ and the visual sentinel $s_t$ for next caption word $w_t$ emittance. The mixing is governed by a sentinel gate mass $\beta_t$ determined from the visual sentinel $s_t$ and the current hidden state of the Sn-LSTM decoder $h_t$.

Each of the features discussed in this particular implementation section for other system and method implementations apply equally to this system implementation. As indicated above, all the other features are not repeated here and should be considered repeated by reference.

The system can be a computer-implemented system. The system can be a neural network-based system.

The adaptive attender (FIG. 11) enhances attention directed to the image context when a next caption word is a visual word, as shown in FIGS. 16, 18, and 19. The adaptive attender (FIG. 11) enhances attention directed to the visual sentinel when a next caption word is a non-visual word or linguistically correlated to the previously emitted caption word, as shown in FIGS. 16, 18, and 19.

The system can further comprise a trainer, which in turn further comprises a preventer. The preventer prevents, during training, backpropagation of gradients from the Sn-LSTM decoder to the CNN encoder when a next caption word is a non-visual word or linguistically correlated to the previously emitted caption word. The trainer and the preventer can each run on at least one of the numerous parallel processors.

Other implementations may include a non-transitory computer readable storage medium storing instructions executable by a processor to perform actions of the system described above.

In yet another implementation, the technology disclosed presents an automated image captioning system. The system runs on numerous parallel processors. The system can be a computer-implemented system. The system can be a neural network-based system.

The system comprises an image encoder (FIG. 1). The image encoder can run on at least one of the numerous parallel processors. The image encoder processes an input image through a convolutional neural network (abbreviated CNN) to generate an image representation.

The system comprises a language decoder (FIG. 8). The language decoder can run on at least one of the numerous parallel processors. The language decoder processes a previously emitted caption word combined with the image representation through a recurrent neural network (abbreviated RNN) to emit a sequence of caption words.

The system comprises an adaptive attender (FIG. 11). The adaptive attender can run on at least one of the numerous parallel processors. The adaptive attender enhances attention directed to the image representation when a next caption word is a visual word. The adaptive attender enhances attention directed to memory contents of the language decoder when the next caption word is a non-visual word or linguistically correlated to the previously emitted caption word.

Each of the features discussed in this particular implementation section for other system and method implementations apply equally to this system implementation. As indicated above, all the other features are not repeated here and should be considered repeated by reference.

Other implementations may include a non-transitory computer readable storage medium storing instructions executable by a processor to perform actions of the system described above.

In yet further implementation, the technology disclosed presents an automated image captioning system. The system runs on numerous parallel processors. The system can be a computer-implemented system. The system can be a neural network-based system.

The system comprises an image encoder (FIG. 1). The image encoder can run on at least one of the numerous parallel processors. The image encoder processes an input image through a convolutional neural network (abbreviated CNN) to generate an image representation.

The system comprises a language decoder (FIG. 8). The language decoder can run on at least one of the numerous parallel processors. The language decoder processes a previously emitted caption word combined with the image representation through a recurrent neural network (abbreviated RNN) to emit a sequence of caption words.

The system comprises a sentinel gate mass/gate probability mass $\beta_t$. The sentinel gate mass can run on at least one of the numerous parallel processors. The sentinel gate mass controls accumulation of the image representation and memory contents of the language decoder for next caption word emittance. The sentinel gate mass is determined from a visual sentinel of the language decoder and a current hidden state of the language decoder.

Each of the features discussed in this particular implementation section for other system and method implementations apply equally to this system implementation. As indicated above, all the other features are not repeated here and should be considered repeated by reference.

Other implementations may include a non-transitory computer readable storage medium storing instructions executable by a processor to perform actions of the system described above.

In one further implementation, the technology disclosed presents a system that automates a task. The system runs on numerous parallel processors. The system can be a computer-implemented system. The system can be a neural network-based system.

The system comprises an encoder. The encoder can run on at least one of the numerous parallel processors. The encoder processes an input through at least one neural network to generate an encoded representation.

The system comprises a decoder. The decoder can run on at least one of the numerous parallel processors. The decoder processes a previously emitted output combined with the encoded representation through at least one neural network to emit a sequence of outputs.

The system comprises an adaptive attender. The adaptive attender can run on at least one of the numerous parallel processors. The adaptive attender uses a sentinel gate mass to mix the encoded representation and memory contents of the decoder for emitting a next output. The sentinel gate mass is determined from the memory contents of the decoder and a current hidden state of the decoder. The sentinel gate mass can run on at least one of the numerous parallel processors.

Each of the features discussed in this particular implementation section for other system and method implementations apply equally to this system implementation. As indicated above, all the other features are not repeated here and should be considered repeated by reference.

In one implementation, when the task is text summarization, the system comprises a first recurrent neural network (abbreviated RNN) as the encoder that processes an input document to generate a document encoding and a second RNN as the decoder that uses the document encoding to emit a sequence of summary words.

In one other implementation, when the task is question answering, the system comprises a first RNN as the encoder that processes an input question to generate a question encoding and a second RNN as the decoder that uses the question encoding to emit a sequence of answer words.

In another implementation, when the task is machine translation, the system comprises a first RNN as the encoder that processes a source language sequence to generate a source encoding and a second RNN as the decoder that uses the source encoding to emit a target language sequence of translated words.

In yet another implementation, when the task is video captioning, the system comprises a combination of a convolutional neural network (abbreviated CNN) and a first RNN as the encoder that process video frames to generate a video encoding and a second RNN as the decoder that uses the video encoding to emit a sequence of caption words.

In yet further implementation, when the task is image captioning, the system comprises a CNN as the encoder that process an input image to generate an image encoding and a RNN as the decoder that uses the image encoding to emit a sequence of caption words.

The system can determine an alternative representation of the input from the encoded representation. The system can then use the alternative representation, instead of the encoded representation, for processing by the decoder and mixing by the adaptive attender.

The alternative representation can be a weighted summary of the encoded representation conditioned on the current hidden state of the decoder.

The alternative representation can be an averaged summary of the encoded representation.

Other implementations may include a non-transitory computer readable storage medium storing instructions executable by a processor to perform actions of the system described above.

In one other implementation, the technology disclosed presents a system for machine generation of a natural language caption for an input image I. The system runs on numerous parallel processors. The system can be a computer-implemented system. The system can be a neural network-based system.

FIG. 10 depicts the disclosed adaptive attention model for image captioning that automatically decides how heavily to rely on visual information, as opposed to linguistic information, to emit a next caption word. The sentinel LSTM (Sn-LSTM) of FIG. 8 is embodied in and implemented by the adaptive attention model as a decoder. FIG. 11 depicts one implementation of modules of an adaptive attender that is part of the adaptive attention model disclosed in FIG. 12. The adaptive attender comprises a spatial attender, an extractor, a sentinel gate mass determiner, a sentinel gate mass softmax, and a mixer (also referred to herein as an adaptive context vector producer or an adaptive context producer). The spatial attender in turn comprises an adaptive comparator, an adaptive attender softmax, and an adaptive convex combination accumulator.

The system comprises a convolutional neural network (abbreviated CNN) encoder (FIG. 1) for processing the input image through one or more convolutional layers to generate image features $V=[v_1, \ldots v_k]$, $v_i \in \mathbb{R}^d$ by k image regions that represent the image I. The CNN encoder can run on at least one of the numerous parallel processors.

The system comprises a sentinel long short-term memory network (abbreviated Sn-LSTM) decoder (FIG. 8) for processing a previously emitted caption word $w_{t-1}$ combined with the image features to produce a current hidden state $h_t$ of the Sn-LSTM decoder at each decoder timestep. The Sn-LSTM decoder can run on at least one of the numerous parallel processors.

The system comprises an adaptive attender, shown in FIG. 11. The adaptive attender can run on at least one of the numerous parallel processors. The adaptive attender further comprises a spatial attender (FIGS. 11 and 13) for spatially attending to the image features $V=[v_1, \ldots v_k]$, $v_i \in \mathbb{R}^d$ at each decoder timestep to produce an image context $c_t$ conditioned on the current hidden state $h_t$ of the Sn-LSTM decoder. The adaptive attender further comprises an extractor (FIGS. 11 and 13) for extracting, from the Sn-LSTM decoder, a visual sentinel $s_t$ at each decoder timestep. The visual sentinel $s_t$ includes visual context determined from previously processed image features and textual context determined from previously emitted caption words. The adaptive attender further comprises mixer (FIGS. 11 and 13) for mixing $\Sigma$ the image context $c_t$ and the visual sentinel $s_t$ to produce an adaptive context $\hat{c}_t$ at each decoder timestep. The mixing is governed by a sentinel gate mass $\beta_t$ determined from the visual sentinel $s_t$ and the current hidden state $h_t$ of the Sn-LSTM decoder. The spatial attender, the extractor, and the mixer can each run on at least one of the numerous parallel processors.

The system comprises an emitter (FIGS. 5 and 13) for generating the natural language caption for the input image I based on the adaptive contexts $\hat{c}_t$ produced over successive decoder timesteps by the mixer. The emitter can run on at least one of the numerous parallel processors.

Each of the features discussed in this particular implementation section for other system and method implementations apply equally to this system implementation. As indicated above, all the other features are not repeated here and should be considered repeated by reference.

The Sn-LSTM decoder can further comprise an auxiliary sentinel gate (FIG. 8) for producing the visual sentinel $s_t$ at each decoder timestep. The auxiliary sentinel gate can run on at least one of the numerous parallel processors.

The adaptive attender can further comprise a sentinel gate mass softmax (FIGS. 11 and 13) for exponentially normalizing attention values $[\lambda_1, \ldots \lambda_k]$ of the image features and a gate value $[\eta_t]$ of the visual sentinel to produce an adaptive sequence $\phi$ of attention probability masses $[\alpha_1, \ldots \alpha_k]$ and the sentinel gate mass $\beta_t$ at each decoder timestep. The sentinel gate mass softmax can run on at least one of the numerous parallel processors.

The adaptive sequence $\hat{\alpha}_t$ can be determined as:

$$\hat{\alpha}_t = \mathrm{softmax}([z_t; w_h^T \tan h(W_s s_t + (W_g h_t))])$$

In the equation above, [;] denotes concatenation, $W_s$ and $W_g$ are weight parameters. $W_g$ can be the same weight parameter as in equation (6). $\hat{\alpha}_t \in \mathbb{R}^{k+1}$ is the attention distribution over both the spatial image features $V=[v_1, \ldots v_k]$, $v_i \in \mathbb{R}^d$ as well as the visual sentinel vector $s_t$. In one implementation, the last element of the adaptive sequence is the sentinel gate mass $\beta_t = \alpha_{t[k+1]}$.

The probability over a vocabulary of possible words at time t can be determined by the vocabulary softmax of the emitter (FIG. 5) as follows:

$$p_t = \mathrm{softmax}(W_p(\hat{c}_t + h_t))$$

In the above equation, $W_p$ is the weight parameter that is learnt.

The adaptive attender can further comprise a sentinel gate mass determiner (FIGS. 11 and 13) for producing at each decoder timestep the sentinel gate mass $\beta_t$ as a result of interaction between the current decoder hidden state $h_t$ and the visual sentinel $s_t$. The sentinel gate mass determiner can run on at least one of the numerous parallel processors.

The spatial attender can further comprise an adaptive comparator (FIGS. 11 and 13) for producing at each decoder timestep the attention values $[\lambda_1, \ldots \lambda_k]$ as a result of interaction between the current decoder hidden state $h_t$ and the image features $V=[v_1, \ldots v_k]$, $v_i \in \mathbb{R}^d$. The adaptive comparator can run on at least one of the numerous parallel processors. In some implementations, the attention and gate values $[\lambda_1, \ldots \lambda_k, \eta_t]$ are determined by processing the current decoder hidden state $h_t$, the image features $V=[v_1, \ldots v_k]$, $v_i \in \mathbb{R}^d$, and the sentinel state vector $s_t$ through a single layer neural network applying a weight matrix and a nonlinearity layer applying a hyperbolic tangent (tan h) squashing function (to produce an output between −1 and 1). In some implementations, the attention and gate values $[\lambda_1, \ldots \lambda_k, \eta_t]$ are determined by processing the current decoder hidden state $h_t$, the image features $V=[v_1, \ldots v_k]$, $v_i \in \mathbb{R}^d$, and the sentinel state vector $s_t$ through a dot producer or inner producter. In yet other implementations, the attention and gate values $[\lambda_1, \ldots \lambda_k, \eta_t]$ are determined by processing the current decoder hidden state $h_t$, the image features $V=[v_1, \ldots v_k]$, $v_i \in \mathbb{R}^d$, and the sentinel state vector $s_t$ through a bilinear form producter.

The spatial attender can further comprise an adaptive attender softmax (FIGS. 11 and 13) for exponentially normalizing the attention values for the image features to produce the attention probability masses at each decoder timestep. The adaptive attender softmax can run on at least one of the numerous parallel processors.

The spatial attender can further comprise an adaptive convex combination accumulator (also referred to herein as mixer or adaptive context producer or adaptive context vector producter) (FIGS. 11 and 13) for accumulating, at each decoder timestep, the image context as a convex combination of the image features scaled by attention probability masses determined using the current decoder hidden state. The sentinel gate mass can run on at least one of the numerous parallel processors.

The system can further comprise a trainer (FIG. 25). The trainer in turn further comprises a preventer for preventing backpropagation of gradients from the Sn-LSTM decoder to the CNN encoder when a next caption word is a non-visual word or linguistically correlated to a previously emitted caption word. The trainer and the preventer can each run on at least one of the numerous parallel processors.

The adaptive attender further comprises the sentinel gate mass/gate probability mass $\beta_t$ for enhancing attention directed to the image context when a next caption word is a visual word. The adaptive attender further comprises the sentinel gate mass/gate probability mass $\beta_t$ for enhancing attention directed to the visual sentinel when a next caption word is a non-visual word or linguistically correlated to the previously emitted caption word. The sentinel gate mass can run on at least one of the numerous parallel processors.

Other implementations may include a non-transitory computer readable storage medium storing instructions executable by a processor to perform actions of the system described above.

In one implementation, the technology disclosed presents a recurrent neural network system (abbreviated RNN). The RNN runs on numerous parallel processors. The RNN can be a computer-implemented system.

The RNN comprises a sentinel long short-term memory network (abbreviated Sn-LSTM) that receives inputs at each of a plurality of timesteps. The inputs include at least an input for a current timestep, a hidden state from a previous timestep, and an auxiliary input for the current timestep. The Sn-LSTM can run on at least one of the numerous parallel processors.

The RNN generates outputs at each of the plurality of timesteps by processing the inputs through gates of the Sn-LSTM. The gates include at least an input gate, a forget gate, an output gate, and an auxiliary sentinel gate. Each of the gates can run on at least one of the numerous parallel processors.

The RNN stores in a memory cell of the Sn-LSTM auxiliary information accumulated over time from (1) processing of the inputs by the input gate, the forget gate, and the output gate and (2) updating of the memory cell with gate outputs produced by the input gate, the forget gate, and the output gate. The memory cell can be maintained and persisted in a database (FIG. 9).

The auxiliary sentinel gate modulates the stored auxiliary information from the memory cell for next prediction. The modulation is conditioned on the input for the current timestep, the hidden state from the previous timestep, and the auxiliary input for the current timestep.

Each of the features discussed in this particular implementation section for other system and method implementations apply equally to this system implementation. As indicated above, all the other features are not repeated here and should be considered repeated by reference.

The auxiliary input can be visual input comprising image data and the input can be a text embedding of a most recently emitted word and/or character. The auxiliary input can be a text encoding from another long short-term memory network (abbreviated LSTM) of an input document and the input can be a text embedding of a most recently emitted word and/or character. The auxiliary input can be a hidden state vector from another LSTM that encodes sequential data and the input can be a text embedding of a most recently emitted word and/or character. The auxiliary input can be a prediction derived from a hidden state vector from another LSTM that encodes sequential data and the input can be a text embedding of a most recently emitted word and/or character. The auxiliary input can be an output of a convolutional neural network (abbreviated CNN). The auxiliary input can be an output of an attention network.

The prediction can be a classification label embedding.

The Sn-LSTM can be further configured to receive multiple auxiliary inputs at a timestep, with at least one auxiliary input comprising concatenated vectors.

The auxiliary input can be received only at an initial timestep.

The auxiliary sentinel gate can produce a sentinel state at each timestep as an indicator of the modulated auxiliary information.

The outputs can comprise at least a hidden state for the current timestep and a sentinel state for the current timestep.

The RNN can be further configured to use at least the hidden state for the current timestep and the sentinel state for the current timestep for making the next prediction.

The inputs can further include a bias input and a previous state of the memory cell.

The Sn-LSTM can further include an input activation function.

The auxiliary sentinel gate can gate a pointwise hyperbolic tangent (abbreviated tan h) of the memory cell.

The auxiliary sentinel gate at the current timestep t can be defined as $aux_t = \sigma(W_x x_t + W_h h_{t-1})$, where $W_x$ and $W_h$ are weight parameters to be learned, $x_t$ is the input for the current timestep, $aux_t$ is the auxiliary sentinel gate applied on the memory cell $m_t$, and $\sigma$ denotes logistic sigmoid activation.

The sentinel state/visual sentinel at the current timestep t is defined as $s_t = aux_t \odot \tan h(m_t)$, where $s_t$ is the sentinel state, $aux_t$ is the auxiliary sentinel gate applied on the memory cell $m_t$, $\odot$ represents element-wise product, and tan h denotes hyperbolic tangent activation.

Other implementations may include a non-transitory computer readable storage medium storing instructions executable by a processor to perform actions of the system described above.

In another implementation, the technology disclosed presents a sentinel long short-term memory network (abbreviated Sn-LSTM) that processes auxiliary input combined with input and previous hidden state. The Sn-LSTM runs on numerous parallel processors. The Sn-LSTM can be a computer-implemented system.

The Sn-LSTM comprises an auxiliary sentinel gate that applies on a memory cell of the Sn-LSTM and modulates use of auxiliary information during next prediction. The auxiliary information is accumulated over time in the memory cell at least from the processing of the auxiliary input combined with the input and the previous hidden state. The auxiliary sentinel gate can run on at least one of the numerous parallel processors. The memory cell can be maintained and persisted in a database (FIG. 9).

Each of the features discussed in this particular implementation section for other system and method implementations apply equally to this system implementation. As indicated above, all the other features are not repeated here and should be considered repeated by reference.

The auxiliary sentinel gate can produce a sentinel state at each timestep as an indicator of the modulated auxiliary information, conditioned on an input for a current timestep, a hidden state from a previous timestep, and an auxiliary input for the current timestep.

The auxiliary sentinel gate can gate a pointwise hyperbolic tangent (abbreviated tan h) of the memory cell.

Other implementations may include a non-transitory computer readable storage medium storing instructions executable by a processor to perform actions of the system described above.

In yet another implementation, the technology disclosed presents a method of extending a long short-term memory network (abbreviated LSTM). The method can be a computer-implemented method. The method can be a neural network-based method.

The method includes extending a long short-term memory network (abbreviated LSTM) to include an auxiliary sentinel gate. The auxiliary sentinel gate applies on a memory cell of the LSTM and modulates use of auxiliary information during next prediction. The auxiliary information is accumulated over time in the memory cell at least from the processing of auxiliary input combined with current input and previous hidden state.

Each of the features discussed in this particular implementation section for other system and method implementations apply equally to this method implementation. As indicated above, all the other features are not repeated here and should be considered repeated by reference.

The auxiliary sentinel gate can produce a sentinel state at each timestep as an indicator of the modulated auxiliary information, conditioned on an input for a current timestep, a hidden state from a previous timestep, and an auxiliary input for the current timestep.

The auxiliary sentinel gate can gate a pointwise hyperbolic tangent (abbreviated tan h) of the memory cell.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above.

In one further implementation, the technology disclosed presents a recurrent neural network system (abbreviated RNN) for machine generation of a natural language caption for an image. The RNN runs on numerous parallel processors. The RNN can be a computer-implemented system.

FIG. 9 shows one implementation of modules of a recurrent neural network (abbreviated RNN) that implements the Sn-LSTM of FIG. 8.

The RNN comprises an input provider (FIG. 9) for providing a plurality of inputs to a sentinel long short-term memory network (abbreviated Sn-LSTM) over successive timesteps. The inputs include at least an input for a current timestep, a hidden state from a previous timestep, and an auxiliary input for the current timestep. The input provider can run on at least one of the numerous parallel processors.

The RNN comprises a gate processor (FIG. 9) for processing the inputs through each gate in a plurality of gates of the Sn-LSTM. The gates include at least an input gate (FIGS. 8 and 9), a forget gate (FIGS. 8 and 9), an output gate (FIGS. 8 and 9), and an auxiliary sentinel gate (FIGS. 8 and 9). The gate processor can run on at least one of the numerous parallel processors. Each of the gates can run on at least one of the numerous parallel processors.

The RNN comprises a memory cell (FIG. 9) of the Sn-LSTM for storing auxiliary information accumulated over time from processing of the inputs by the gate processor. The memory cell can be maintained and persisted in a database (FIG. 9).

The RNN comprises a memory cell updater (FIG. 9) for updating the memory cell with gate outputs produced by the input gate (FIGS. 8 and 9), the forget gate (FIGS. 8 and 9), and the output gate (FIGS. 8 and 9). The memory cell updater can run on at least one of the numerous parallel processors.

The RNN comprises the auxiliary sentinel gate (FIGS. 8 and 9) for modulating the stored auxiliary information from the memory cell to produce a sentinel state at each timestep. The modulation is conditioned on the input for the current timestep, the hidden state from the previous timestep, and the auxiliary input for the current timestep.

The RNN comprises an emitter (FIG. 5) for generating the natural language caption for the image based on the sentinel states produced over successive timesteps by the auxiliary sentinel gate. The emitter can run on at least one of the numerous parallel processors.

Each of the features discussed in this particular implementation section for other system and method implementations apply equally to this system implementation. As indicated above, all the other features are not repeated here and should be considered repeated by reference.

The auxiliary sentinel gate can further comprise an auxiliary nonlinearity layer (FIG. 9) for squashing results of processing the inputs within a predetermined range. The auxiliary nonlinearity layer can run on at least one of the numerous parallel processors.

The Sn-LSTM can further comprise a memory nonlinearity layer (FIG. 9) for applying a nonlinearity to contents of the memory cell. The memory nonlinearity layer can run on at least one of the numerous parallel processors.

The Sn-LSTM can further comprise a sentinel state producer (FIG. 9) for combining the squashed results from the auxiliary sentinel gate with the nonlinearized contents of the memory cell to produce the sentinel state. The sentinel state producer can run on at least one of the numerous parallel processors.

The input provider (FIG. 9) can provide the auxiliary input that is visual input comprising image data and the input is a text embedding of a most recently emitted word and/or character. The input provider (FIG. 9) can provide the auxiliary input that is a text encoding from another long short-term memory network (abbreviated LSTM) of an input document and the input is a text embedding of a most recently emitted word and/or character. The input provider (FIG. 9) can provide the auxiliary input that is a hidden state from another LSTM that encodes sequential data and the input is a text embedding of a most recently emitted word and/or character. The input provider (FIG. 9) can provide the auxiliary input that is a prediction derived from a hidden state from another LSTM that encodes sequential data and the input is a text embedding of a most recently emitted word and/or character. The input provider (FIG. 9) can provide the auxiliary input that is an output of a convolutional neural network (abbreviated CNN). The input provider (FIG. 9) can provide the auxiliary input that is an output of an attention network.

The input provider (FIG. 9) can further provide multiple auxiliary inputs to the Sn-LSTM at a timestep, with at least one auxiliary input further comprising concatenated features.

The Sn-LSTM can further comprise an activation gate (FIG. 9).

Other implementations may include a non-transitory computer readable storage medium storing instructions executable by a processor to perform actions of the system described above.

This application uses the phrases "visual sentinel", "sentinel state", "visual sentinel vector", and "sentinel state vector" interchangeably. A visual sentinel vector can represent, identify, and/or embody a visual sentinel. A sentinel state vector can represent, identify, and/or embody a sentinel state. This application uses the phrases "sentinel gate" and "auxiliary sentinel gate" interchangeably.

This application uses the phrases "hidden state", "hidden state vector", and "hidden state information" interchangeably. A hidden state vector can represent, identify, and/or embody a hidden state. A hidden state vector can represent, identify, and/or embody hidden state information.

This application uses the word "input", the phrase "current input", and the phrase "input vector" interchangeably. An input vector can represent, identify, and/or embody an input. An input vector can represent, identify, and/or embody a current input.

This application uses the words "time" and "timestep" interchangeably.

This application uses the phrases "memory cell state", "memory cell vector", and "memory cell state vector" interchangeably. A memory cell vector can represent, identify, and/or embody a memory cell state. A memory cell state vector can represent, identify, and/or embody a memory cell state.

This application uses the phrases "image features", "spatial image features", and "image feature vectors" interchangeably. An image feature vector can represent, identify, and/or embody an image feature. An image feature vector can represent, identify, and/or embody a spatial image feature.

This application uses the phrases "spatial attention map", "image attention map", and "attention map" interchangeably.

This application uses the phrases "global image feature" and "global image feature vector" interchangeably. A global image feature vector can represent, identify, and/or embody a global image feature.

This application uses the phrases "word embedding" and "word embedding vector" interchangeably. A word embedding vector can represent, identify, and/or embody a word embedding.

This application uses the phrases "image context", "image context vector", and "context vector" interchangeably. An image context vector can represent, identify, and/or embody an image context. A context vector can represent, identify, and/or embody an image context.

This application uses the phrases "adaptive image context", "adaptive image context vector", and "adaptive context vector" interchangeably. An adaptive image context vector can represent, identify, and/or embody an adaptive image context. An adaptive context vector can represent, identify, and/or embody an adaptive image context.

This application uses the phrases "gate probability mass" and "sentinel gate mass" interchangeably.

Results

FIG. 17 illustrates some example captions and spatial attentional maps for the specific words in the caption. It can be seen that our learns alignments that correspond with human intuition. Even in the examples in which incorrect captions were generated, the model looked at reasonable regions in the image.

FIG. 18 shows visualization of some example image captions, word-wise visual grounding probabilities, and corresponding image/spatial attention maps generated by our model. The model successfully learns how heavily to attend to the image and adapts the attention accordingly. For example, for non-visual words such as "of" and "a" the model attends less to the images. For visual words like "red", "rose", "doughnuts", "woman", and "snowboard" our model assigns a high visual grounding probabilities (over 0.9). Note that the same word can be assigned different visual grounding probabilities when generated in different contexts. For example, the word "a" typically has a high visual grounding probability at the beginning of a sentence, since without any language context, the model needs the visual information to determine plurality (or not). On the other hand, the visual grounding probability of "a" in the phrase "on a table" is much lower because it is unlikely for something to be on more than one table.

FIG. 19 presents similar results as shown in FIG. 18 on another set of example image captions, word-wise visual grounding probabilities, and corresponding image/spatial attention maps generated using the technology disclosed.

FIGS. 20 and 21 are example rank-probability plots that illustrate performance of our model on the COCO (common objects in context) and Flickr30k datasets respectively. It can be seen that our model attends to the image more when generating object words like "dishes", "people", "cat", "boat"; attribute words like "giant", "metal", "yellow", and number words like "three". When the word is non-visual, our model learns to not attend to the image such as for "the", "of", "to" etc. For more abstract words such as "crossing", "during" etc., our model attends less than the visual words and attends more than the non-visual words. The model does not rely on any syntactic features or external knowledge. It discovers these trends automatically through learning.

FIG. 22 is an example graph that shows localization accuracy over the generated caption for top 45 most frequent COCO object categories. The blue colored bars show localization accuracy of the spatial attention model and the red colored bars show localization accuracy of the adaptive attention model. FIG. 22 shows that both models perform well on categories such as "cat", "bed", "bus", and "truck". On smaller objects, such as "sink", "surfboard", "clock", and "frisbee" both models do not perform well. This is because the spatial attention maps are directly rescaled from a 7×7 feature map, which loses a considerable spatial information and detail.

FIG. 23 is a table that shows performance of the technology disclosed on the Flicker30k and COCO datasets based on various natural language processing metrics, including BLEU (bilingual evaluation understudy), METEOR (metric for evaluation of translation with explicit ordering), CIDEr (consensus-based image description evaluation), ROUGE-L (recall-oriented understudy for gisting evaluation-longest common subsequence), and SPICE (semantic propositional image caption evaluation). The table in FIG. 23 shows that our adaptive attention model significantly outperforms our spatial attention model. The CIDEr score performance of our adaptive attention model is 0.531 versus 0.493 for spatial attention model on Flickr30k database. Similarly, CIDEr scores of adaptive attention model and spatial attention model on COCO database are 1.085 and 1.029 respectively.

We compare our model to state-of-the-art system on the COCO evaluation server as shown in a leaderboard of the published state-of-the-art in FIG. 24. It can be seen from the leaderboard that our approach achieves the best performance on all metrics among the published systems hence setting a new state-of-the-art by a significant margin.

Computer System

FIG. 25 is a simplified block diagram of a computer system that can be used to implement the technology disclosed. Computer system includes at least one central processing unit (CPU) that communicates with a number of peripheral devices via bus subsystem. These peripheral devices can include a storage subsystem including, for example, memory devices and a file storage subsystem, user interface input devices, user interface output devices, and a network interface subsystem. The input and output devices allow user interaction with computer system. Network interface subsystem provides an interface to outside networks, including an interface to corresponding interface devices in other computer systems.

In one implementation, at least the spatial attention model, the controller, the localizer (FIG. 25), the trainer (which comprises the preventer), the adaptive attention model, and the sentinel LSTM (Sn-LSTM) are communicably linked to the storage subsystem and to the user interface input devices.

User interface input devices can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system.

User interface output devices can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system to the user or to another machine or computer system.

Storage subsystem stores programming and data constructs that provide the functionality of some or all of the modules and methods described herein. These software modules are generally executed by deep learning processors.

Deep learning processors can be graphics processing units (GPUs) or field-programmable gate arrays (FPGAs). Deep learning processors can be hosted by a deep learning cloud platform such as Google Cloud Platform™, Xilinx™, and Cirrascale™. Examples of deep learning processors include Google's Tensor Processing Unit (TPU)™, rackmount solutions like GX4 Rackmount Series™, GX8 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem used in the storage subsystem can include a number of memories including a main random access memory (RAM) for storage of instructions and data during program execution and a read only memory (ROM) in which fixed instructions are stored. A file storage subsystem can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem in the storage subsystem, or in other machines accessible by the processor.

Bus subsystem provides a mechanism for letting the various components and subsystems of computer system communicate with each other as intended. Although bus subsystem is shown schematically as a single bus, alternative implementations of the bus subsystem can use multiple busses.

Computer system itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system depicted in FIG. 25 is intended only as a specific example for purposes of illustrating the preferred embodiments of the present invention. Many other configurations of computer system are possible having more or less components than the computer system depicted in FIG. 25.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A recurrent neural network system (RNN) running on numerous parallel processors, comprising:
    a sentinel long short-term memory network (Sn-LSTM) that:
        comprises a memory cell, an input gate, a forget gate, an output gate, and an auxiliary sentinel gate;
        receives inputs at each of a plurality of timesteps, the inputs including at least:
            an input for a current timestep,
            a hidden state from a previous timestep, and
            an auxiliary input for the current timestep;
        stores in the memory cell auxiliary information accumulated over time from processing of the inputs by the input gate, the forget gate, and the output gate;
        updates the memory cell with gate outputs produced by the input gate, the forget gate, and the output gate;

generates, using the output gate, a hidden state as a first output of the Sn-LSTM based on the input, for the current timestep, the hidden state from the previous timestep, and information in the memory cell; and generates, using the auxiliary sentinel gate, a sentinel state as a second output of the Sn-LSTM different from the first output based on the auxiliary input for the current timestep, the hidden state from the previous timestep, and the information in the memory cell;

wherein the auxiliary sentinel gate modulates the stored auxiliary information from the memory cell for a next prediction, with the modulation conditioned on the input for the current timestep, the hidden state from the previous timestep, and the auxiliary input for the current timestep.

2. The RNN of claim 1, wherein the auxiliary input is visual input comprising image data and the input for the current timestep is a text embedding of a most recently emitted word and/or character.

3. The RNN of claim 1, wherein the auxiliary input for the current timestep is a text encoding from another long short-term memory network (LSTM) of an input document and the input for the current timestep is a text embedding of a most recently emitted word and/or character.

4. The RNN of claim 1, wherein the auxiliary input for the current timestep is a hidden state vector from another LSTM that encodes sequential data and the input for the current timestep is a text embedding of a most recently emitted word and/or character.

5. The RNN of claim 1, wherein the auxiliary input for the current timestep is a prediction derived from a hidden state vector from another LSTM that encodes sequential data and the input for the current timestep is a text embedding of a most recently emitted word and/or character.

6. The RNN of claim 5, wherein the prediction is a classification label embedding.

7. The RNN of claim 1, wherein the auxiliary input for the current timestep is an output of a convolutional neural network (CNN).

8. The RNN of claim 1, wherein the auxiliary input for the current timestep is an output of an attention network.

9. The RNN of claim 1, wherein the Sn-LSTM is further configured to receive multiple auxiliary inputs at a timestep, with at least one auxiliary input comprising concatenated vectors.

10. The RNN of claim 1, wherein the auxiliary input for the current timestep is received only at an initial timestep.

11. The RNN of claim 1, wherein the auxiliary sentinel gate produces a sentinel state at each timestep as an indicator of the modulated auxiliary information.

12. The RNN of claim 11, wherein the sentinel state at the current timestep t is defined as $s_t = aux_t \odot \tan h(m_t)$, where $s_t$ is the sentinel state, $aux_t$ is the auxiliary sentinel gate applied on the memory cell $m_t$, $\odot$ represents element-wise product, and tan h denotes hyperbolic tangent activation.

13. The RNN of claim 1, further configured to use at least the hidden state for the current timestep and the sentinel state for the current timestep for making the next prediction.

14. The RNN of claim 1, wherein the inputs further include a bias input and a previous state of the memory cell.

15. The RNN of claim 1, wherein the Sn-LSTM further includes an input activation function.

16. The RNN of claim 1, wherein the auxiliary sentinel gate generates a pointwise hyperbolic tangent (tan h) of the memory cell.

17. The RNN of claim 1, wherein the auxiliary sentinel gate at the current timestep t is defined as $aux_t = \sigma(W_x x_t + W_h h_{t-1})$, where $W_x$ and $W_h$ are weight parameters to be learned, $x_t$ is the input for the current timestep, $aux_t$ is the auxiliary sentinel gate applied on the memory cell $m_t$, and $\sigma$ denotes logistic sigmoid activation.

18. A non-transitory, computer-readable medium having computer executable instructions that implement the Sn-LSTM of claim 1.

19. A sentinel long short-term memory network (Sn-LSTM) comprising:
a memory cell for storing a state of the Sn-LSTM;
an output gate that outputs, as a first output of the Sn-LSTM, a current hidden state of the Sn-LSTM based on an input of the Sn-LSTM, a previous hidden state of the Sn-LSTM, and information in the memory cell; and
an auxiliary sentinel gate that:
modulates use of auxiliary information during a next prediction, the auxiliary information being accumulated over time in a memory cell at least from processing of an auxiliary input of the Sn-LSTM combined with the input and the previous hidden state, and
outputs, as a second output of the Sn-LSTM different from the first output, a sentinel state of the Sn-LSTM with the accumulated auxiliary information useful for the next prediction.

20. The Sn-LSTM of claim 19, wherein the auxiliary sentinel gate produces the sentinel state at each timestep as an indicator of the modulated auxiliary information, conditioned on the input for a current timestep, the hidden state from a previous timestep, and the auxiliary input for the current timestep.

21. The Sn-LSTM of claim 19, wherein the auxiliary sentinel gate generates a pointwise hyperbolic tangent (tan h) of the memory cell.

22. A non-transitory, computer-readable medium having computer executable instructions that implement the Sn-LSTM of claim 19.

23. A method comprising:
receiving, at a Sn-LSTM, an input for a current timestep, a hidden state from a previous timestep, and an auxiliary input for the current timestep;
storing, in a memory cell of the Sn-LSTM, auxiliary information accumulated over time from processing of the inputs by an input gate, a forget gate, and an output gate of the Sn-LSTM;
generating, using an output gate of the Sn-LSTM, a hidden state as a first output of the Sn-LSTM based on the input for the current timestep, the hidden state from the previous timestep, and information in the memory cell; and
generating, using an auxiliary sentinel gate of the Sn-LSTM, a sentinel state as a second output of the Sn-LSTM different from the first output based on the auxiliary input for the current timestep, the hidden state from the previous timestep, and the information in the memory cell;
wherein the auxiliary sentinel gate modulates use of auxiliary information during a next prediction, the auxiliary information being accumulated over time in the memory cell at least from the processing of an auxiliary input combined with a current input and a previous hidden state.

24. The method of claim 23, wherein the auxiliary sentinel gate produces the sentinel state at each timestep as an indicator of the modulated auxiliary information, conditioned on the input for a current timestep, the hidden state from the previous timestep, and the auxiliary input for the current timestep.

25. The method of claim 23, wherein the auxiliary sentinel gate generates a pointwise hyperbolic tangent (tan h) of the memory cell.

26. A non-transitory, computer-readable medium having computer executable instructions that carry out the method of claim 23.

27. A computer system running on numerous parallel processors adapted to perform the method of claim 23.

28. A recurrent neural network system (RNN) running on numerous parallel processors for machine generation of a natural language caption for an image, comprising:
  an input provider for providing a plurality of inputs to a sentinel long short-term memory network (Sn-LSTM) over successive timesteps, wherein the inputs include at least an input for a current timestep, a hidden state from a previous timestep, and an auxiliary input for the current timestep;
  the Sn-LSTM comprising:
    at least an input gate, a forget gate, an output gate, and an auxiliary sentinel gate;
    a memory cell for storing auxiliary information accumulated over time from processing of the inputs by the input gate and the forget gate;
    the output gate for generating, as a first output of the Sn-LSTM, a hidden state of the Sn-LSTM from processing of the input for the current timestep, the hidden state from the previous timestep, and contents of the memory cell;
    the auxiliary sentinel gate for modulating the stored auxiliary information from the memory cell to produce, as a second output of the Sn-LSTM, a sentinel state at each timestep, with the modulation conditioned on the input for the current timestep, the hidden state from the previous timestep, and the auxiliary input for the current timestep; and
  an emitter for generating the natural language caption for the image based on the sentinel states produced over successive timesteps by the auxiliary sentinel gate.

* * * * *